US010532367B2

(12) United States Patent
Gopalan et al.

(10) Patent No.: US 10,532,367 B2
(45) Date of Patent: Jan. 14, 2020

(54) THREE-JET FLUIDIC OSCILLATOR CIRCUIT, METHOD AND NOZZLE ASSEMBLY

(71) Applicant: dlhBowles, Inc., Canton, OH (US)

(72) Inventors: Shridhar Gopalan, Westminster, MD (US); Chunling Zhao, Ellicott City, MD (US); Andrew Cameron, Silver Spring, MD (US)

(73) Assignee: DLHBOWLES, INC., Canton, OH (US)

( * ) Notice: Subject to any disclaimer, the term of this patent is extended or adjusted under 35 U.S.C. 154(b) by 168 days.

(21) Appl. No.: 15/406,702

(22) Filed: Jan. 14, 2017

(65) Prior Publication Data

US 2017/0136472 A1 May 18, 2017

Related U.S. Application Data

(63) Continuation of application No. PCT/US2015/040288, filed on Jul. 14, 2015.

(Continued)

(51) Int. Cl.

*B05B 1/08* (2006.01)
*B05B 1/34* (2006.01)
*B60S 1/52* (2006.01)

(52) U.S. Cl.

CPC .................. *B05B 1/08* (2013.01); *B05B 1/34* (2013.01); *B05B 1/3478* (2013.01); *B60S 1/52* (2013.01)

(58) Field of Classification Search

CPC ........... B05B 1/08; B05B 1/3478; B05B 1/34; B05B 17/04; B60S 1/52

(Continued)

(56) References Cited

U.S. PATENT DOCUMENTS 3,185,166 A 5/1965 Horton et al.
3,563,462 A 2/1971 Bauer (Continued)

FOREIGN PATENT DOCUMENTS

DE 2065063 A1 5/1972
GB 1515892 6/1978

(Continued)

OTHER PUBLICATIONS

International Search Report in corresponding International Application No. PCT/US2015/40288, dated Nov. 5, 2015.

*Primary Examiner* — Alexander M Valvis
*Assistant Examiner* — Qingzhang Zhou
(74) *Attorney, Agent, or Firm* — McDonald Hopkins LLC

(57) ABSTRACT

A nozzle assembly includes a fluidic oscillator 100 operating on a pressurized fluid to generate an oscillating spray of fluid droplets, and the oscillator aims fluid jets from first, second and third power nozzles 114A, 114B, 114C into an interaction chamber 118 and toward an upwardly projecting island protuberance 126 defining first, second and third island wall segments. The outermost jets 114A, 114B are aimed at an obtuse angle of 100 to 140 degrees along axes which intersect beyond the island at a Jet intersection point, J1. The upstream end of interaction chamber 118 is defined by first and second laterally offset concave wall surfaces 142, 152 which define left side and right side vortex generating areas so that fluid jet steering vortices may be alternately formed and then displaced distally and shed to steer the fluid jet laterally within interaction chamber 118.

15 Claims, 19 Drawing Sheets

Related U.S. Application Data

(60) Provisional application No. 62/155,826, filed on May 1, 2015, provisional application No. 62/024,762, filed on Jul. 15, 2014.

(58) Field of Classification Search
USPC ........................................................ 239/589.1
See application file for complete search history.

(56) References Cited

U.S. PATENT DOCUMENTS

| | | | | |
|---|---|---|---|---|
| 4,052,002 | A | 10/1977 | Stouffer et al. | |
| 4,151,955 | A * | 5/1979 | Stouffer | B05B 1/08 137/835 |
| 4,157,161 | A | 6/1979 | Bauer | |
| 4,231,519 | A | 11/1980 | Bauer | |
| 4,508,267 | A | 4/1985 | Stouffer | |
| 4,761,036 | A | 8/1988 | Vogel | |
| RE33,158 | E | 2/1990 | Stouffer et al. | |
| 4,905,909 | A | 3/1990 | Woods | |
| 5,035,361 | A | 7/1991 | Stouffer | |
| 5,213,269 | A | 5/1993 | Srinath et al. | |
| 5,971,301 | A | 10/1999 | Stouffer et al. | |
| 6,101,053 | A | 8/2000 | Takahashi | |
| 6,186,409 | B1 | 2/2001 | Srinath et al. | |
| 6,253,782 | B1 | 7/2001 | Raghu | |
| 7,267,290 | B2 | 9/2007 | Gopalan et al. | |
| 7,472,848 | B2 | 1/2009 | Gopalan et al. | |
| 7,651,036 | B2 | 1/2010 | Gopalan | |
| 2005/0087633 | A1 * | 4/2005 | Gopalan | B05B 1/08 239/589.1 |
| 2008/0067267 | A1 | 3/2008 | Gopalan et al. | |
| 2011/0089250 | A1 * | 4/2011 | Zhao | B05B 1/08 239/1 |
| 2011/0233301 | A1 | 9/2011 | Gopalan | |

FOREIGN PATENT DOCUMENTS

| | | |
|---|---|---|
| JP | S62251508 | 11/1987 |
| WO | WO2006049622 | 5/2006 |
| WO | WO2014093590 | 6/2014 |

* cited by examiner

B-B $J_L$ = jet intersection point = 2.7 $P_W$ $I_L$ = interaction region length = 8 $P_W$ $I_W$ = interaction region width = 13 $P_W$ $I_{SW}$ = island width
       = 3.3 - 3.6 $P_W$ Jet angle = 110° = $J_A$ $I_{SL}$ = island location
       = 4.5 $P_W$ DCC dimensions (typical)

$P_W$ = 0.55 mm, $P_d$ = 1.3

$T_W$ = 1 mm, $T_d$ = 1.3

Fan = 60°,

Flow = 840 ml/min @ 22

SP2 ≈ 3 psi methanol

This plotted performance diagram illustrates uniform distribution with liquid spread evenly over the fluidic's fan angle. The illustrated perfomance is significantly better than other types of fluidic nozzles.

THREE-JET FLUIDIC OSCILLATOR CIRCUIT, METHOD AND NOZZLE ASSEMBLY

CROSS REFERENCE TO RELATED APPLICATIONS

This application is a continuation of International Application No. PCT/US2015/040288, filed on Jul. 14, 2015, which claims the benefit of U.S. Provisional Application No. 62/024,762, filed on Jul. 15, 2014, and U.S. Provisional Application No. 62/155,826, filed on May 1, 2015 This application is also related to commonly owned U.S. Pat. Nos. 7,267,290, 7,472,848 and 7,651,036, the entire contents of which are hereby incorporated by reference.

FIELD OF THE INVENTION

This invention relates to fluid handling processes and apparatus. More particularly, this invention relates to a fluidic oscillator and method for use in generating precisely controlled sprays at colder temperatures usually associated with higher viscosity fluids.

BACKGROUND

Fluidic oscillators are well known in the prior art for their ability to provide a wide range of liquid spray patterns by cyclically deflecting a liquid jet. The operation of most fluidic oscillators is characterized by the cyclic deflection of a fluid jet without the use of mechanical moving parts. Consequently, an advantage of fluidic oscillators is that they are not subject to the wear and tear which adversely affects the reliability and operation of other spray devices.

Examples of fluidic oscillators may be found in many patents, including U.S. Pat. No. 3,185,166 (Horton & Bowles), U.S. Pat. No. 3,563,462 (Bauer), U.S. Pat. No. 4,052,002 (Stouffer & Bray), U.S. Pat. No. 4,151,955 (Stouffer), U.S. Pat. No. 4,157,161 (Bauer), U.S. Pat. No. 4,231,519 (Stouffer), which was reissued as RE 33,158, U.S. Pat. No. 4,508,267 (Stouffer), U.S. Pat. No. 5,035,361 (Stouffer), U.S. Pat. No. 5,213,269 (Srinath), U.S. Pat. No. 5,971,301 (Stouffer), U.S. Pat. No. 6,186,409 (Srinath) and U.S. Pat. No. 6,253,782 (Raghu). An oscillating liquid jet can yield a variety of spray patterns for the downstream distribution of the liquid droplets that are faulted as this liquid jet breaks apart in the surrounding gaseous environment.

For the spraying of some high viscosity liquids (i.e., 15-20 centipoise), the "mushroom oscillator" disclosed in commonly owned U.S. Pat. No. 6,253,782 was found to be especially useful. However, it also has been found that, as the temperature of such liquids continues to decrease so as to cause their viscosity to increase (e.g., 25 centipoise), the performance of this type of oscillator can deteriorate to the point where it no longer provides a jet that is sufficiently oscillatory in nature to allow its spray to be distributed over an appreciable fan angle. This situation is especially problematic in automotive windshield washer applications.

An early approach to solving that problem by the instant applicant led to the method and structure of the "Three Jet Island" fluidic circuit of commonly owned U.S. Pat. No. 4,761,036, as illustrated in FIGS. 1A-1Q and incorporated herein by reference. The fluidic circuit geometry of insert 18 (illustrated in FIG. 1G) was more effective than the fluidic oscillators which had come before, but applicants' experiments revealed that for certain kinds of fluids and at certain temperatures, fluidic insert 18, like the other prior art fluidic oscillators in some circumstances may not (a) reliably begin the oscillation inducing fluid dynamic mechanisms or (b) reliably maintain the fluid jet oscillation steering mechanisms within the interaction chamber and both are needed to reliably establish and maintain the desired oscillating spray, especially with cold or viscous fluids.

There is a need, therefore, for an improved method and apparatus for generating sprays of colder, more viscous fluids.

SUMMARY

Accordingly, it is an object of the present invention to overcome the above mentioned difficulties by providing a durable, reliable and cost effective nozzle structure, fluidic oscillator structure and fluid distribution or spray generation method to enhance the reliable initiation and maintenance of an oscillating spray and broaden the dynamic and cold performance envelope for nozzle assemblies to be used in automotive and other applications.

Another object of the present invention is to provide a fluidic nozzle and oscillator circuit having improved reliably when fluid flow begins to induce the fluid dynamic mechanisms within the interaction chamber to quickly establish and maintain the desired oscillating spray, especially with cold or viscous fluids.

In accordance with an illustrative embodiment of the present invention, a fluidic circuit is configured as a nozzle assembly with a fluidic oscillator. Fluidic oscillators or fluidic circuits are often configured for use in housings which define a channel, port or slot that receives and provides boundaries for the fluid paths defined in the fluidic circuit. For an illustrative example of how a fluidic oscillator or fluidic circuit might be employed, as shown in applicant's U.S. Pat. No. 7,651,036, FIG. 4, (and included here as FIG. 1F) a nozzle assembly with the new fluidic inserts described below is configured with a housing which defines a substantially hollow fluid-impermeable structure with an interior lumen and one or more ports or slots defining a substantially rectangular passage or aperture with smooth interior slot wall surfaces.

A nozzle assembly can be configured to include one or more fluidic circuit inserts or chips which are dimensioned to be tightly received in and held by the slot defined within the sidewall of the housing. When the fluidic circuit insert is fitted tightly within the housing's port or slot, the nozzle assembly provides a channel for fluid communication between the housing's interior lumen and the exterior of the housing so that fluid entering the housing's interior lumen may be used to generate an oscillating spray directed distally and aimed by the orientation and configuration of the housing.

The new fluidic circuit geometries of the present invention operates on a new and surprisingly robust oscillation inducing and maintenance mechanism which provides reliable formation of moving vortices that generate a repeatable oscillating jet stream and subsequent spray. Current prototypes of the circuit of the present invention produce a planar spray with a fan angles from 20° to 120°. A first embodiment of the fluidic circuit of the present invention has a plurality of sections which cooperate with one another to act upon the flowing fluid passing therethrough to generate internal vortices and a desired oscillating spray. In sequence, pressurized fluid initially flows into an inlet which passes through an optional filtering section and then into a fluid flow dividing three-way power nozzle section, where fluid is passed into and through first, second and third power nozzles which are configured generate and aim first, second and third fluid jets into a vortex generating interaction chamber or cavity section where the three jets collide with one another and with internal features to initiate and maintain distally moving fluid vortices. The interaction chamber or cavity section terminates distally in a throat or outlet orifice configured to distally project the oscillating spray into the ambient environment.

In accordance with the present invention, an improved nozzle assembly includes at least one fluidic oscillator which operates on pressurized fluid flowing therethrough to generate and aim that oscillating spray of fluid droplets. The fluidic oscillator's internal geometry aims the fluid jets from the first, second and third power nozzles into the interaction chamber and against an upwardly projecting island protuberance defining first, second and third island wall segments. The island protuberance is spaced from but aligned along a common central axis with the outlet orifice at the distal or spray end of the interaction chamber and the interaction chamber defines an interaction region having an interaction region width, Iw in the range of 12.5-13.5 times the Power Nozzle Width, Pw (preferably 13 Pw). The interaction region has an axial length or height, $I_I$ in the range of 7.5-8.5 Pw and the first and third (outermost) jets intersect downstream at a selected jet intersection point, $J_I$, which is distally spaced from the central or second orifice by a distance equal to 2.5-3 Pw. The first and second (outermost) jets are aimed and aligned along first and second jet axes which intersect at a selected obtuse Jet intersection angle, $J_A$ which is preferably approximately 110 degrees.

In the fluidic geometry of the present invention, the first, second and third orifices are defined between (a) the interaction chamber's opposing left and right side walls and (b) first and second curved, transverse fluid impermeable wall segments, where the first curved, transverse wall segment provides a first concave wall surface defining a first cylindrical wall section of a selected radius and the second curved, transverse wall segment provides a second concave wall surface defining a second cylindrical wall section of a second selected radius which is substantially equal to said first concave wall surface's selected radius. The first and second concave wall surfaces define laterally offset cylindrical wall sections configured to receive and contain laterally offset fluid vortices which are formed, grow and move about within the interaction chamber.

The first, second and third jets cause vortices to form and move about within the interaction chamber in a bistable periodic oscillation cycle. The bistable oscillation cycle is initiated when the center jet alternates on each side of the interaction chamber's upwardly or inwardly projecting island and that center jet alternately sheds or generates laterally spaced (e.g., left and right side) vortices. Initially the center jet is on one side of the island (e.g., the left side) resulting in a large vortex on that (e.g., the left) side. This left side vortex partially blocks or suppresses the left side jet flowing from the left side orifice, resulting in (a) initiation of a right side vortex upstream of the island and proximate the right side orifice and (b) the right jet dominating the output jet exiting the outlet orifice or throat lumen, thereby defining the left extreme end or edge of the fluidic's spray fan. In time, the left side vortex and right side vortex both move distally and the center jet begins to move towards the opposing (e.g., right) side of the island.

During this transitory phase, the output jet is passing through the center of the spray fan issuing from throat lumen. When the center jet moves laterally to the right side of the island, the output jet spray is aimed at its right extreme of the fan. This oscillation cycle repeats itself at relatively high frequency (e.g., as high as 300 Hz depending on size and operating pressures/flow rates).

In order to ensure that the oscillation is (a) reliably begun and (b) the fluid jet oscillation steering mechanism is reliably maintained within the interaction chamber, especially with cold or viscous fluids, another embodiment having a T-shaped island was refined. The fluidic circuit embodiment with the T-shaped island has a proximally projecting wall segment which provides especially robust oscillation initiation over a very broad range of fluid temperature and viscosity conditions.

DETAILED DESCRIPTION

Figure 1A:
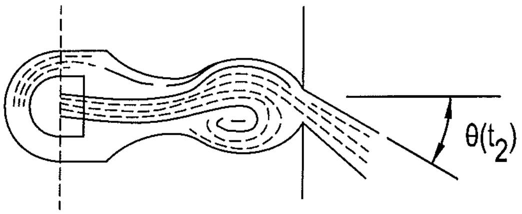
FIGS. 1A-1Q illustrate nozzle assembly components and fluidic circuit configurations described in applicant's previous Three Jet Island fluidic circuit U.S. Pat. No. 7,651,036, in accordance with the prior art.
Figure 1B:
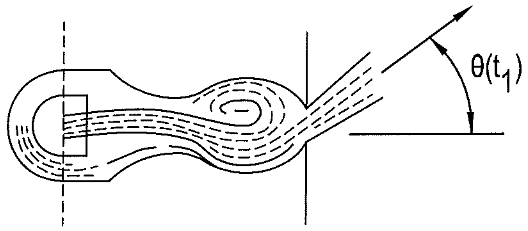
Figure 1C:
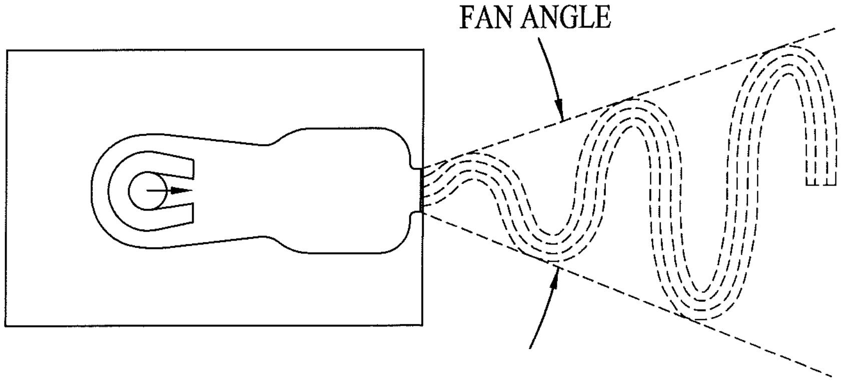
Figure 1D:
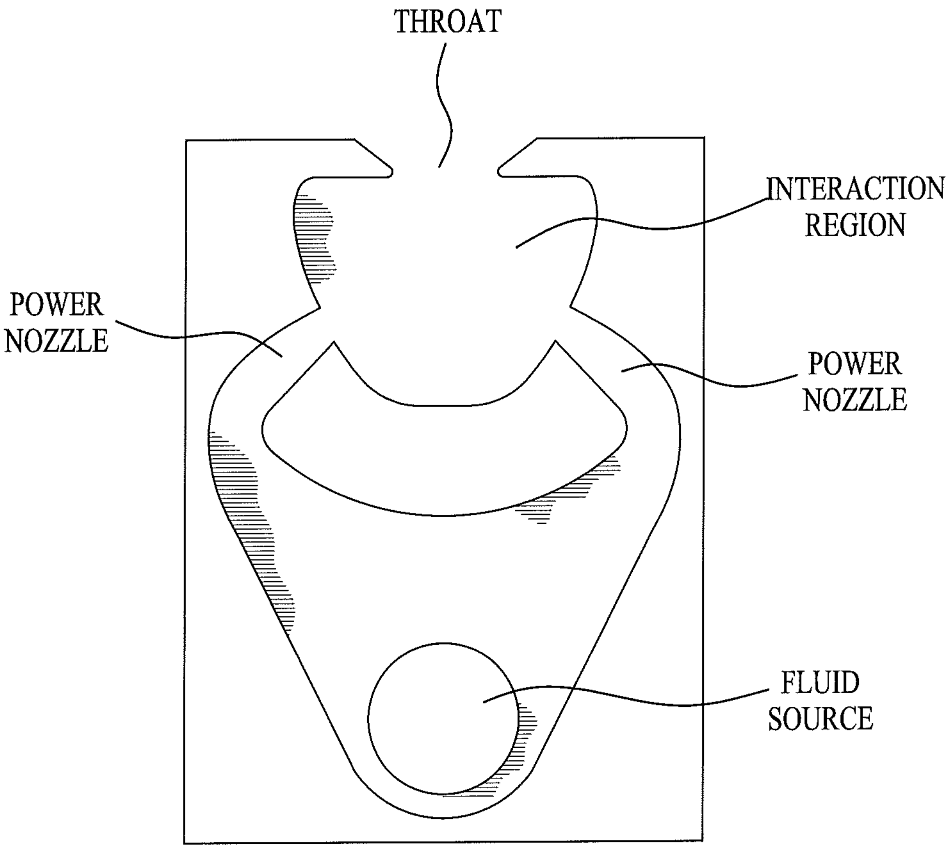
Figure 1E:
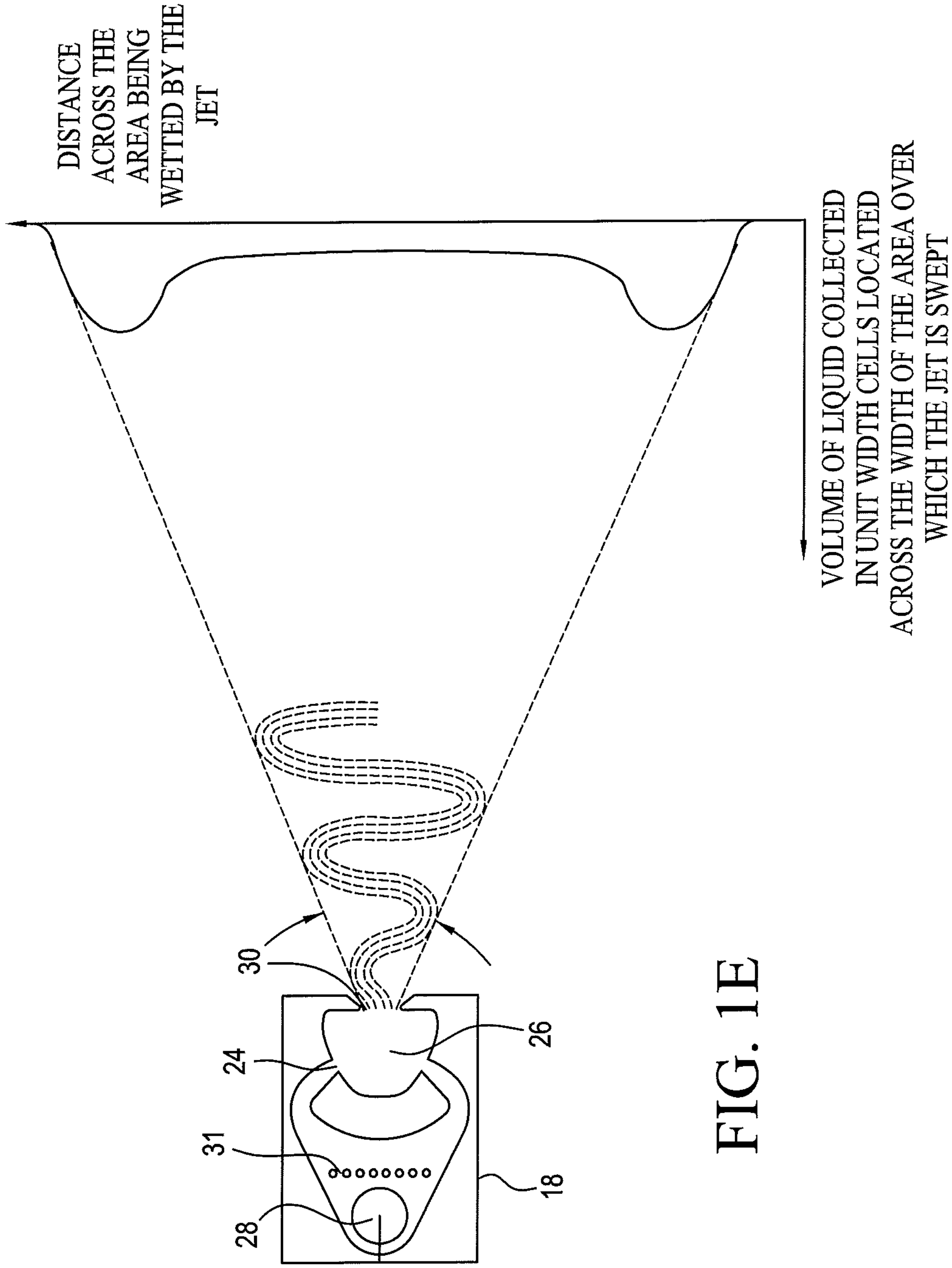
Figure 1F:
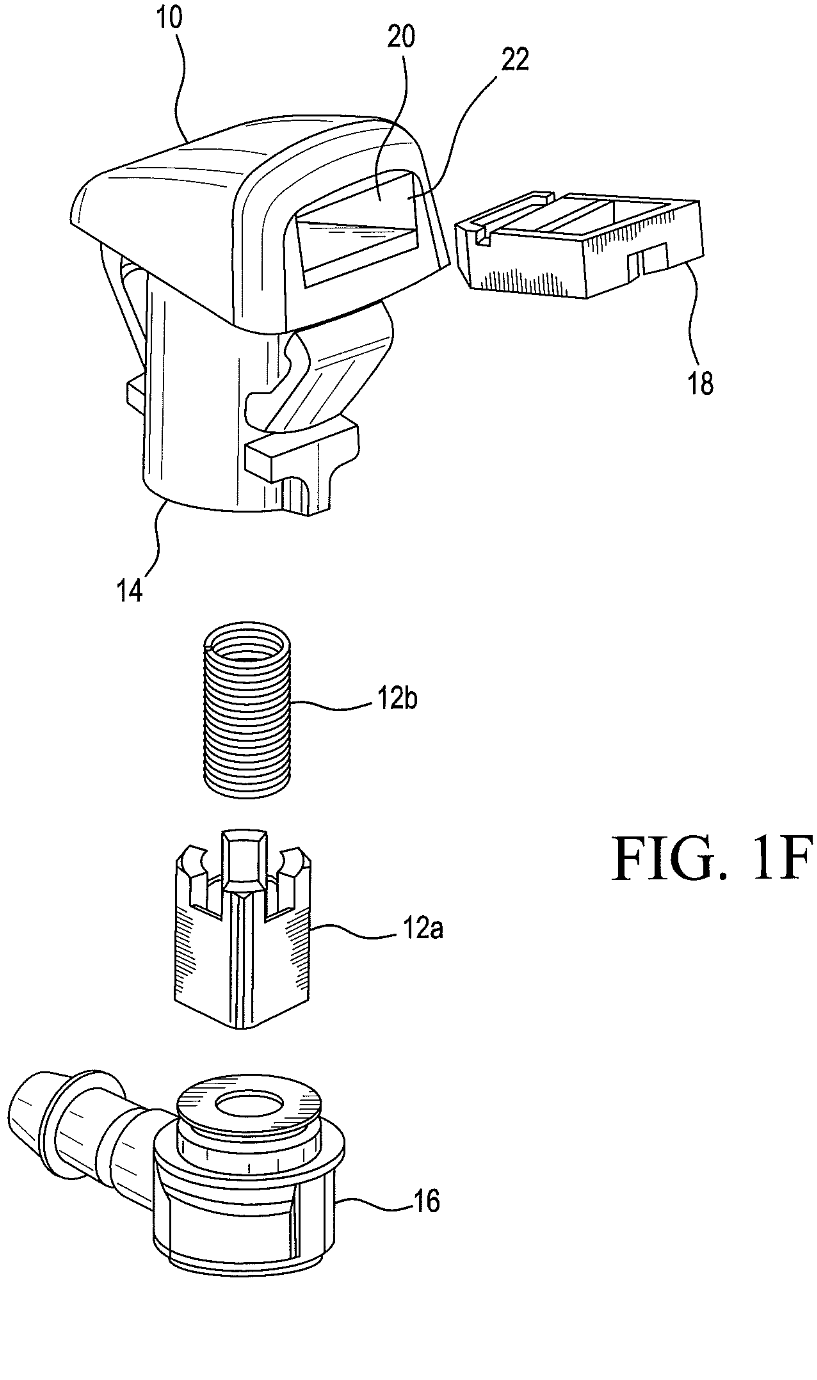
Figure 1G:
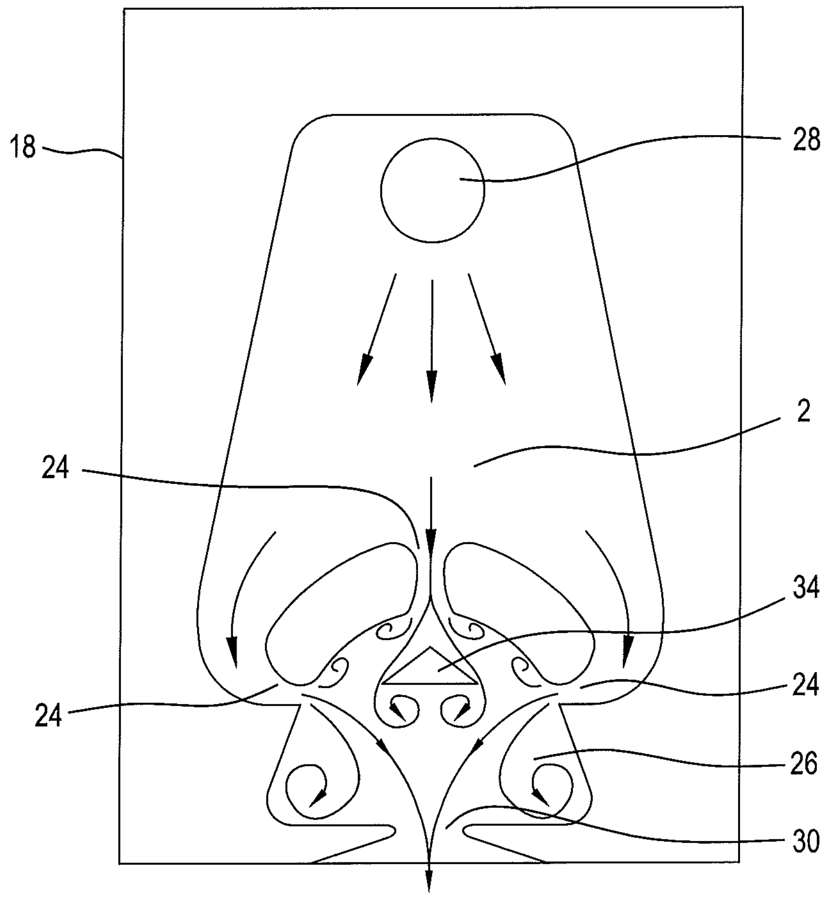
Figure 1H:
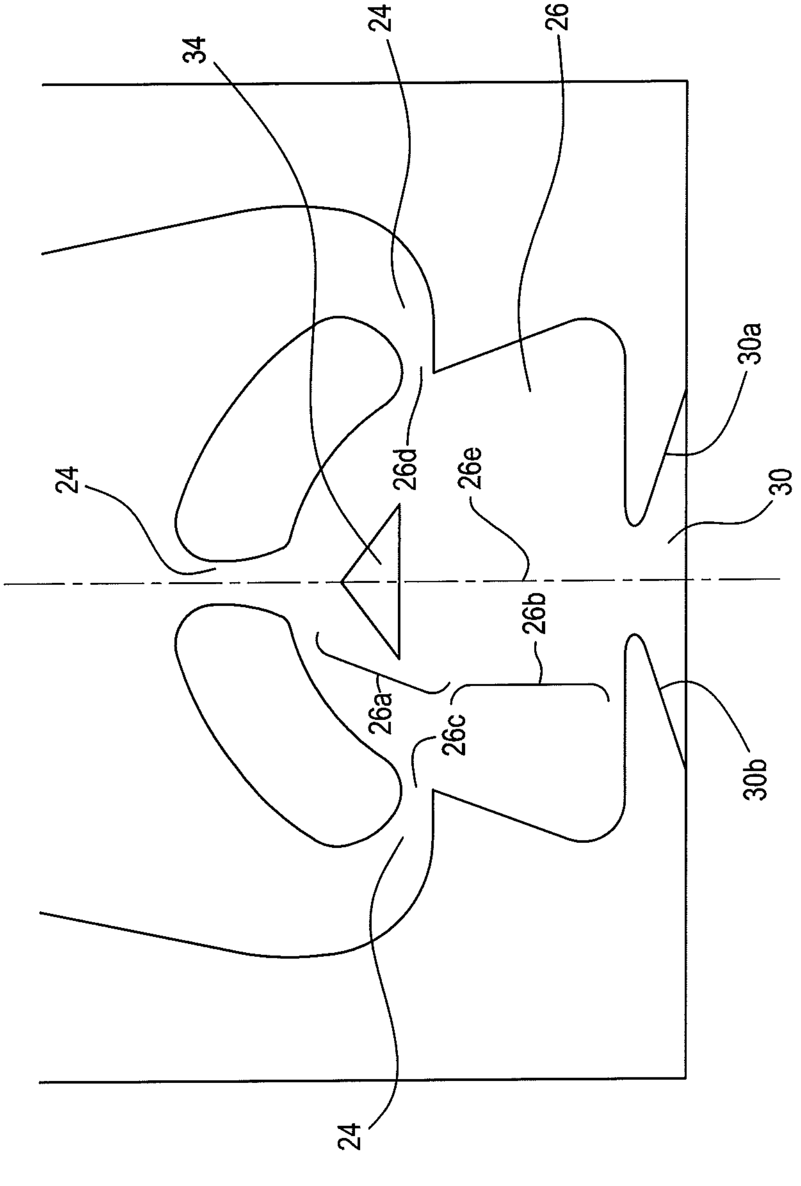
Figure 1I:
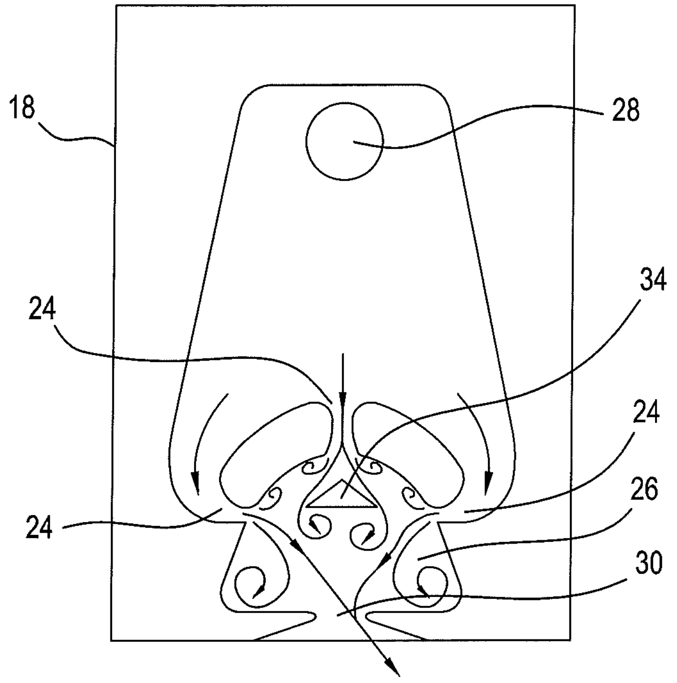
Figure 1J:
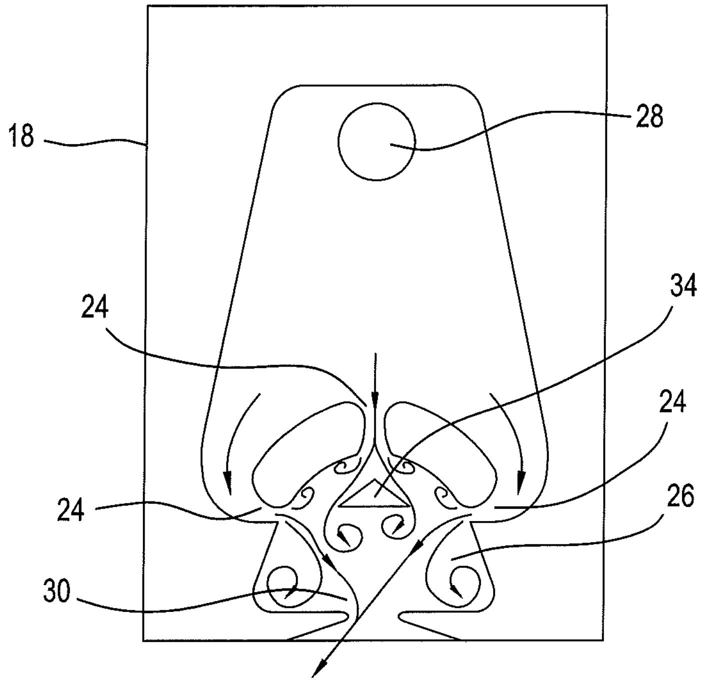
Figure 1K:
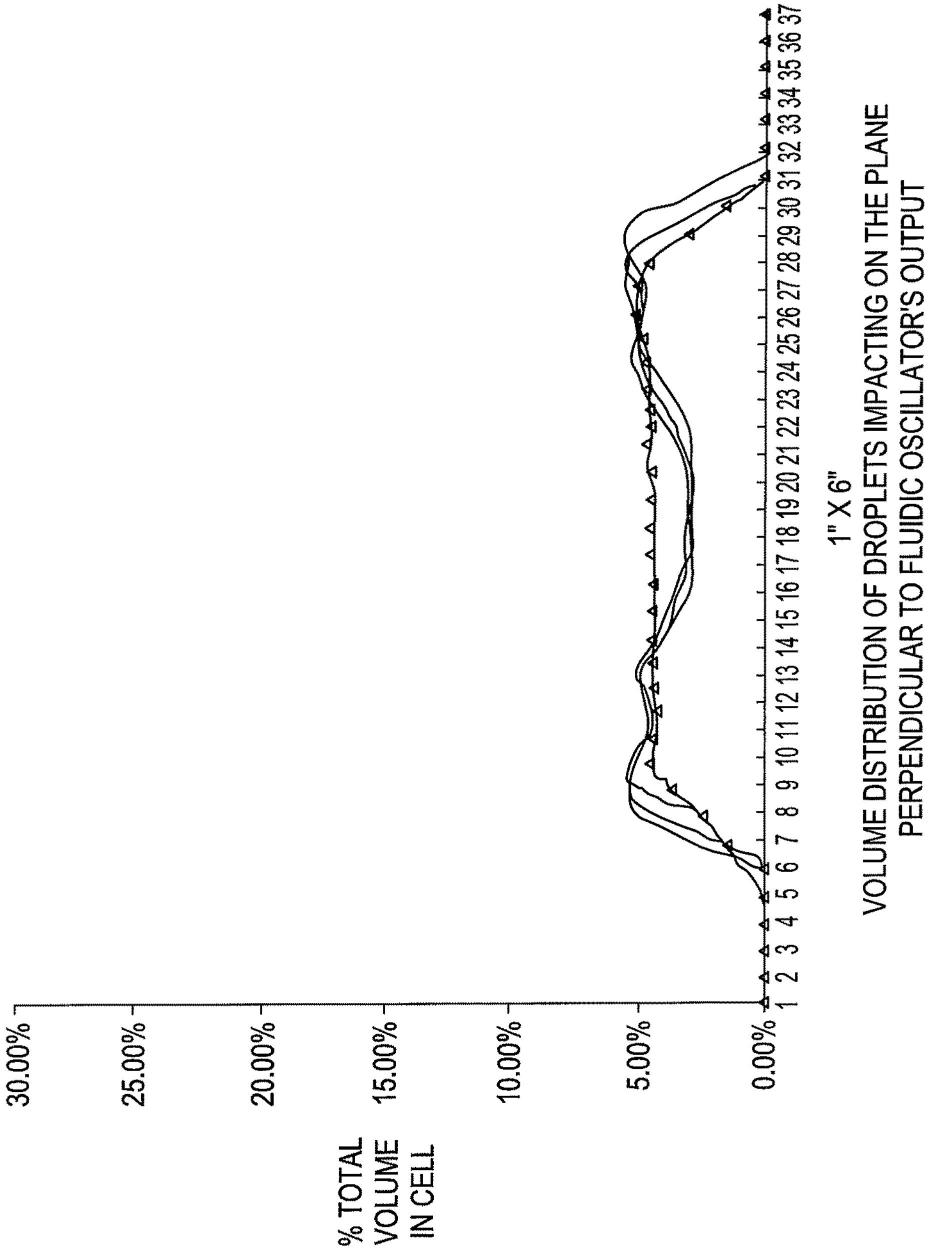
Figure 1L:
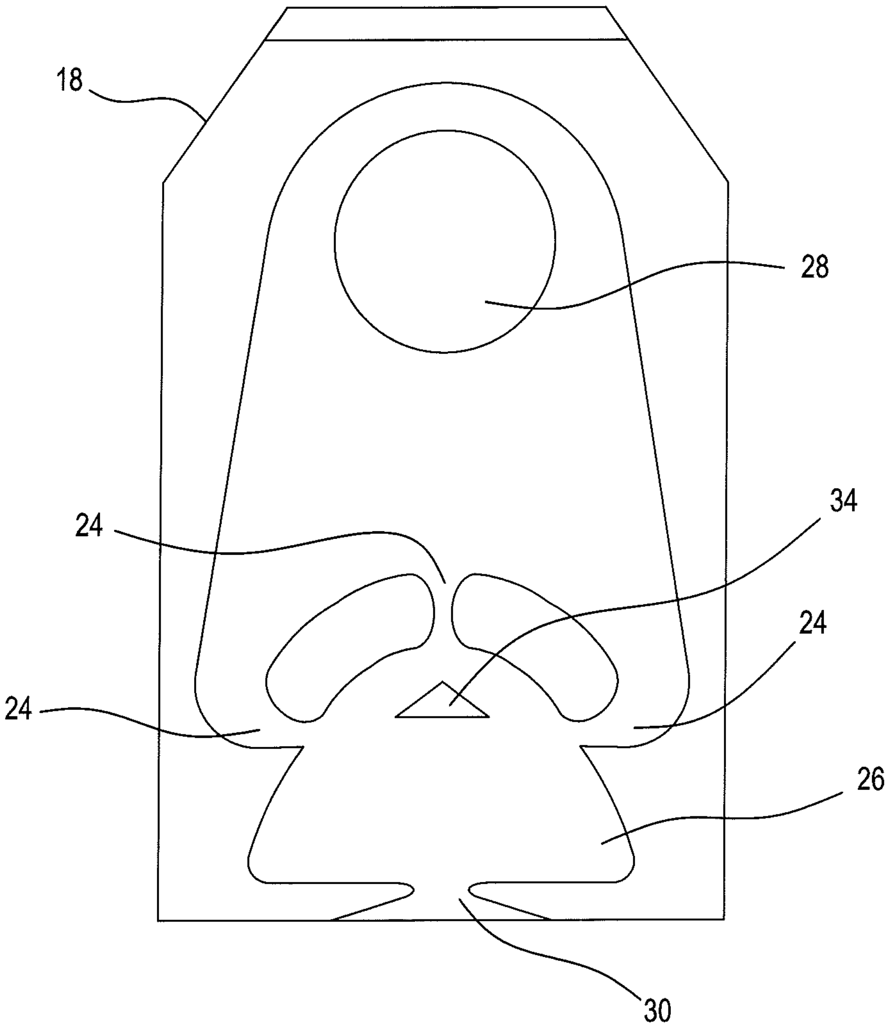
Figure 1M:
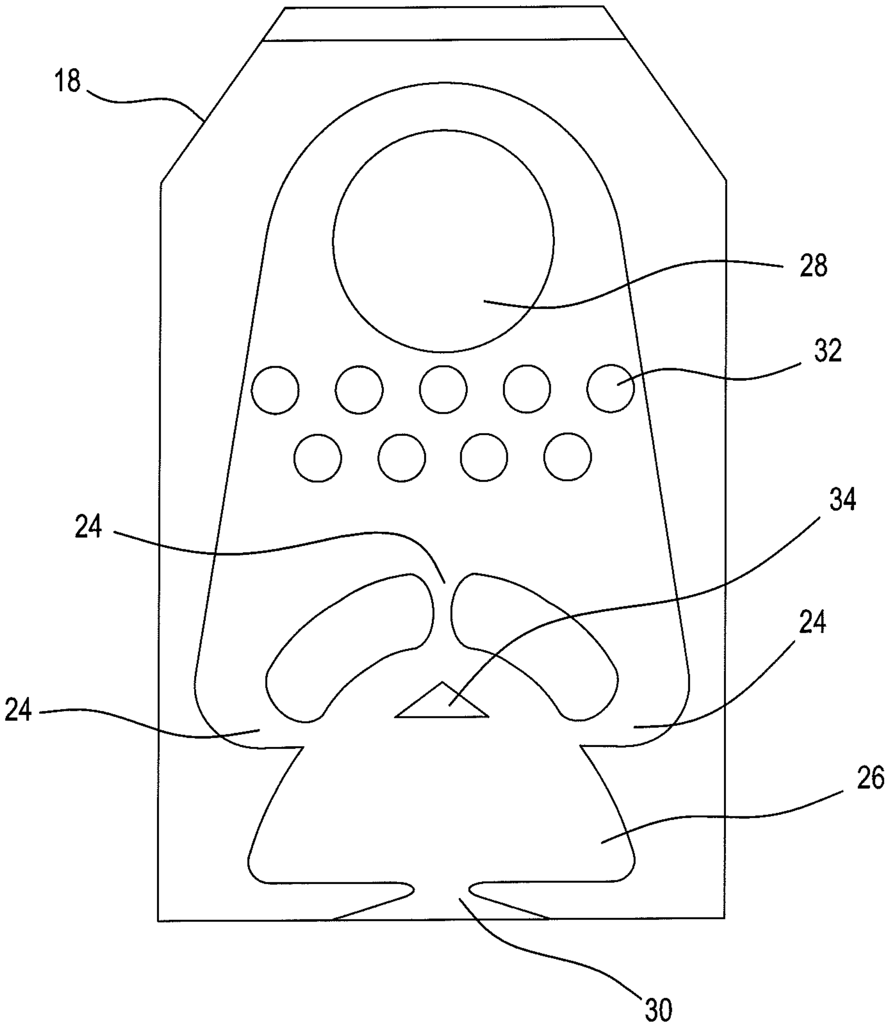
Figure 1N:
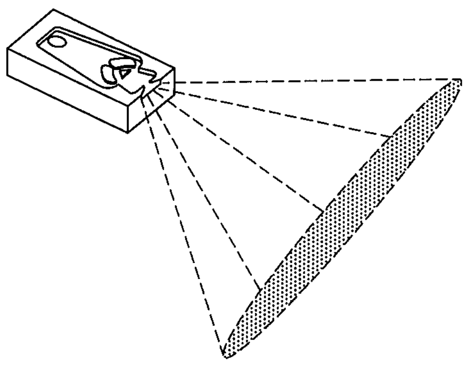
Figure 1O:
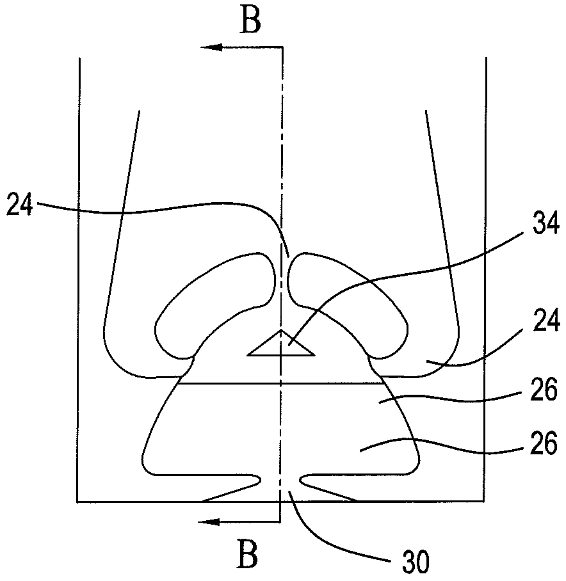
Figure 1P:
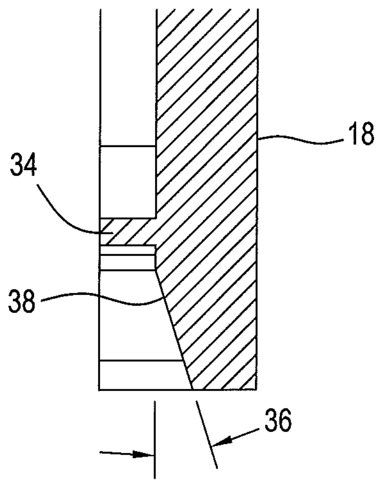
Figure 1Q:
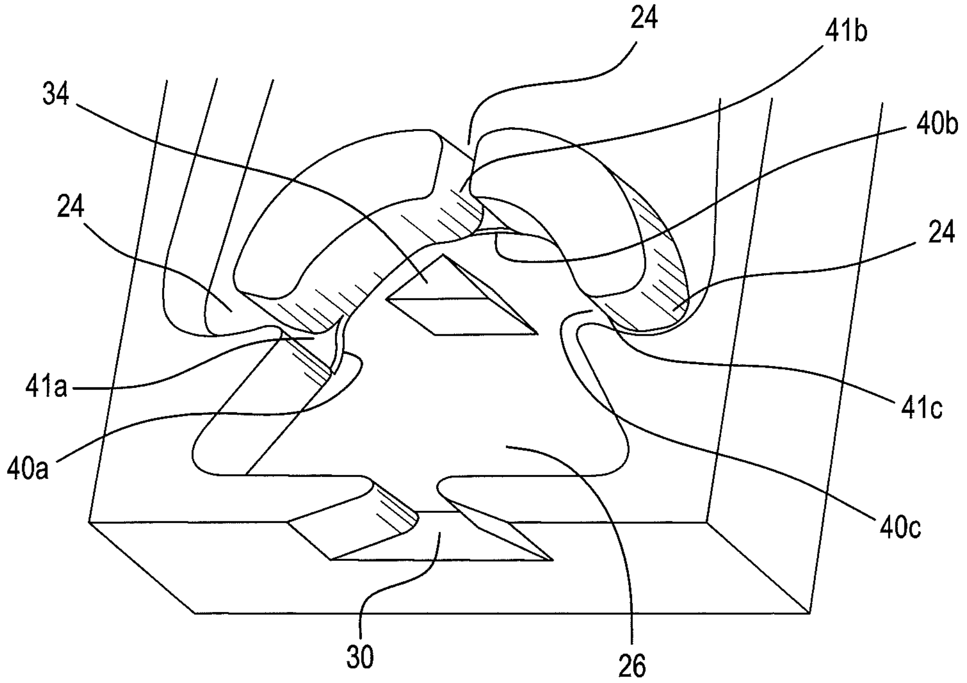

Background FIGS. 1A-1Q illustrate nozzle assembly components and fluidic circuit configurations described in applicant's previous Three Jet Island fluidic circuit U.S. Pat. No. 7,651,036, and are included here partly to provide a consistent nomenclature. Turning now to FIGS. 2-6B, the structure and method of the present invention improve on that prior art by providing enhanced initiation of oscillation-inducing fluid dynamic (i.e., vortex formation and movement) mechanisms and enhanced reliably (meaning that the fluid jet steering mechanisms within the interaction chamber are maintained over a wider range of environmental conditions, especially when spraying cold or viscous fluids). The improved fluidic circuit geometries and methods illustrated in FIGS. 2-6B and described below are adapted for use in applicant's housing structures (such as housing 10, illustrated in FIG. 1F) to provide significantly improved nozzle assemblies for use in automotive and other applications. The nomenclature describing fluid spray performance of the present invention includes the terms "spray fan" and "fan angle" as illustrated in FIGS. 1A-1E and described in applicant's commonly owned U.S. Pat. No. 7,651,036, the entirety of which is incorporated by reference here. In accordance with the illustrative embodiments of the present invention presented here, a fluidic circuit (e.g., 100, 200 or 300) is configured within a nozzle assembly (such as housing 10, illustrated in FIG. 1F). Fluidic oscillators or fluidic circuits are often configured for use in housings which define a cavity, port or slot 20 and the new fluidic inserts (e.g., 100, 200 or 300) described below are configured in a nozzle assembly with a housing which defines a substantially hollow fluid-impermeable structure with an interior lumen and one or more cavities (e.g., 20) ports or slots defining a substantially rectangular passage or aperture with smooth interior slot wall surfaces.

In accordance with the present invention, a nozzle assembly is configured to include one or more fluidic circuit inserts or chips (e.g., 100, 200 or 300) which are dimensioned to be tightly received in and held by the cavity or slot defined within the sidewall of the housing. When the fluidic circuit insert (e.g., 100, 200 or 300) is fitted tightly within the housing's cavity or slot (e.g., 20), the nozzle assembly provides a channel for fluid communication between the housing's interior lumen (which provides a fluid inlet for pressurized fluid) and the exterior of the housing so that fluid entering the housing's interior lumen may be used to generate an oscillating spray directed distally and aimed by the orientation and configuration of the housing.

The nozzle assembly's head (e.g., similar to 10, as illustrated in FIG. 1F) may be in a two-piece configuration. The housing's nozzle head can include a cavity or socket (e.g., 20) which constitutes one of the two main nozzle pieces. The fluidic insert or chip (e.g., 100, 200, or 300) constitutes the other. If the nozzle head includes a cavity to receive a fluidic insert or chip, then a generally flat, planar floor surface defined in that cavity terminates in a wide, generally rectangular opening defined in the distal spray projecting side surface of the housing's distally projecting enclosure. Internally, a fluid transporting lumen from an inlet is in fluid communication with the interior of nozzle head and with a fluidic inlet supply channel or lumen which terminates in an opening in a cavity sidewall surface (e.g., sealing surface 22). The fluid supply lumens communicate with the interior volume defined within the nozzle head's cavity, and when pressurized fluid is pumped into and through the nozzle supply channel, that fluid flows into the cavity and into and through the fluidic (e.g., 100, 200, or 300).

The fluidic insert or chip (e.g., 100, 200, or 300, as will be described in greater detail, below) is a generally flat member adapted to be forced or pressed into the housing's cavity 20 and securely retained therein by the pressure exerted by the housing cavity walls on the insert. For this purpose the material from which the housing is fabricated is a solid plastic which deforms slightly under pressure. The cavity has a top wall and bottom wall which are spaced by a distance substantially equal to the thickness of the insert (e.g., 100, 200, or 300) between the insert top surface and bottom surface. Optionally, the bottom surface may somewhat bowed, making the insert somewhat thicker along its middle. The insert's sidewalls are likewise spaced by a distance substantially equal to the width of insert between its left and right side or lateral edges. In a preferred embodiment, the fluidic circuit insert (e.g., 100, 200, or 300) may be a few thousandths of an inch wider than the nozzle head's cavity 20. The insert (e.g., 100, 200, or 300) and cavity 20 may taper along their axial lengths, being wider at the exposed distal end and narrowing toward the inserted proximal end. The taper may be gradual or may be effected in one or more discrete sections (e.g., as shown in FIG. 2), which are slightly angled toward one another.

The fluidic oscillator is defined in the insert (e.g., 100, 200, or 300) as a plurality of recessed portions in the top surface of a substrate which define fluid passages. All of the fluidic's features are defined as recesses or troughs of equal or varying depths into the top surface of the insert or chip. When the fluidic insert (e.g., 100, 200, or 300) is fully inserted into the housing's slot or cavity, the housing's internal lumen defines an opening into the cavity, and that opening aligns with and communicates with the insert's inlet, so that washer fluid or water flowing into the housing inlet (e.g., 16) flows into the fluidic's interaction chamber (e.g., 118, 218, or 318) to generate oscillating vortices therein, so that an oscillation is established and a jet of fluid is swept back and forth to generate the desired spray 130 which issues through the exit orifice (e.g., 120, 220, or 320). When the selected fluidic insert (e.g., 100, 200, or 300) is pressed or forced into the nozzle head's cavity 20, the cavity's sidewalls 22 are spread slightly and in turn exert a higher pressure along the middle of the insert. The oscillator formed in top surface of the insert (e.g., 100, 200, or 300) is substantially centered between edges of the insert and is very tightly sealed against interior walls of the cavity so that a fluidic oscillator formed in a surface of the insert, or in a surface of the cavity, can be sealed solely by the pressure exerted by the forced fit engagement.

It should be noted that the nozzle head's cavity and fluidic insert (e.g., 100, 200, or 300), although shown as substantially planar, may be arcuate, angled, or otherwise configured, depending upon the shape of nozzle head and spray pattern (e.g., 130) desired. Likewise, oscillator channels may be defined in both the top and bottom surfaces of the insert or in the top and bottom walls of the cavity. The only limitation is that the fluidic oscillator, whichever surface or surfaces it is defined in, is sealed by the abutting surface(s) through the pressure exerted by the force fit within the housing's cavity.

Figure 2:
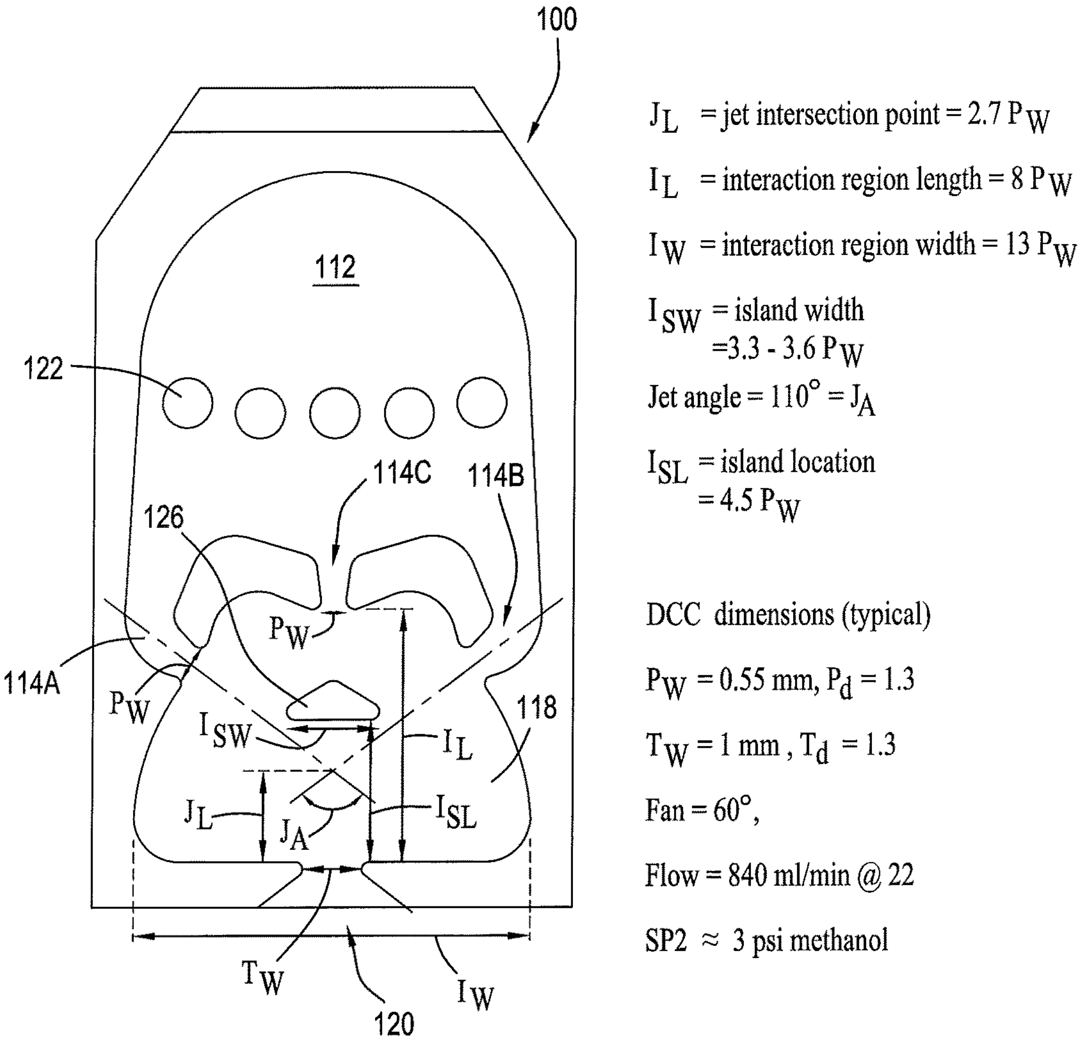
FIG. 2 is a top view or plan view diagram illustrating an improved three jet island fluidic oscillator geometry having an interaction region configured to receive and act upon first, second and third jets entering from first, second and third power nozzles; with the outer jets being configured to intersect at a selected obtuse angle and the center jet impacting directly on a novel island-shaped obturator for generating oscillating sprays with higher viscosity fluids, in accordance with the present invention.
Figure 3A:
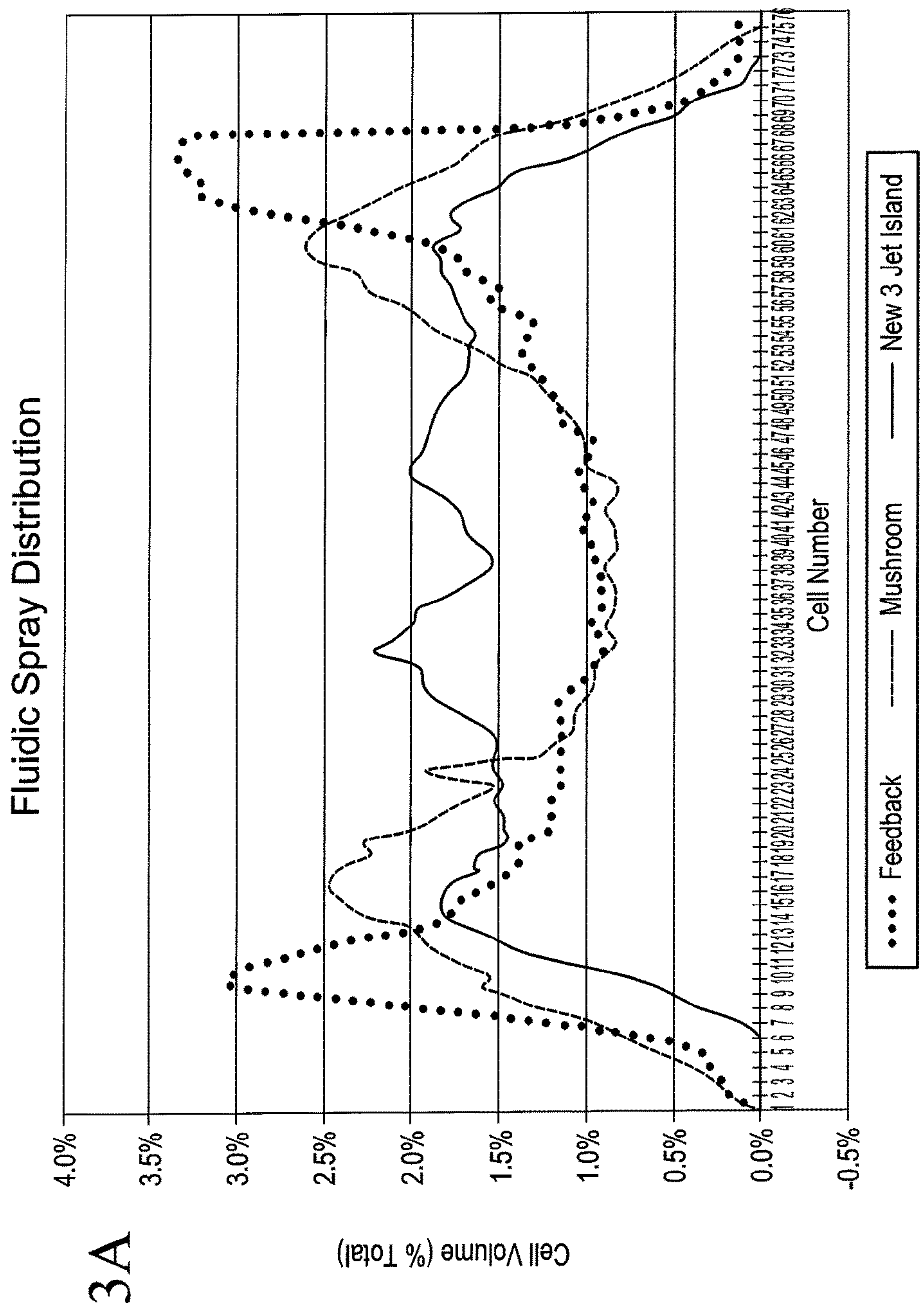
FIG. 3A is a plotted diagram illustrating the spray performance of a nozzle assembly configured with the fluidic oscillator of FIG. 2 (compared to prior art feedback and mushroom fluidic oscillators) and used to generate sprays in accordance with the methods of the present invention.
Figure 3B:
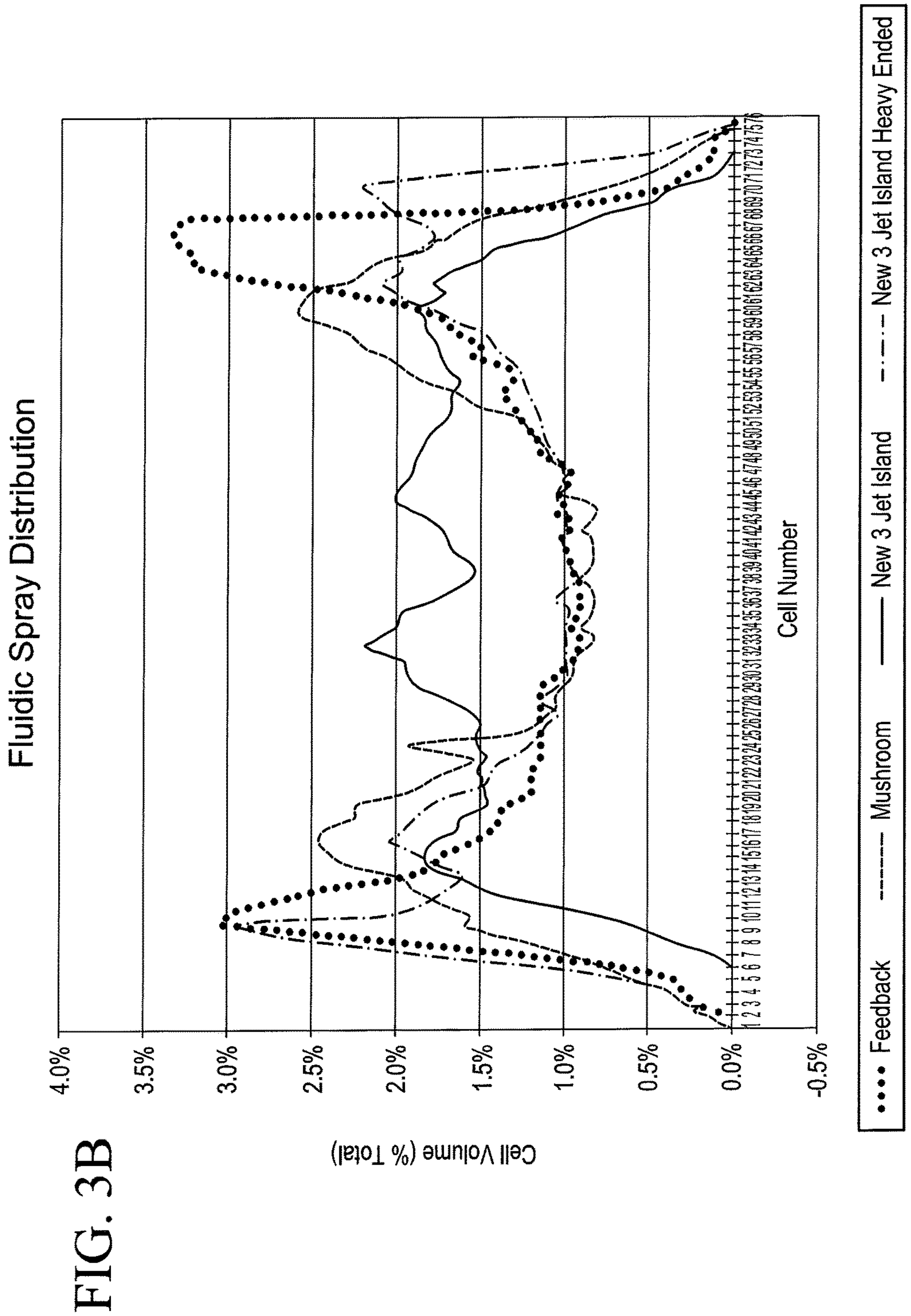
FIG. 3B is another plotted diagram illustrating spray performance of a nozzle assembly configured similarly to the fluidic oscillator of FIG. 2, except with the first and third (outer) power nozzles defining larger lumens than the lumen of the second (center) power nozzle, as may be and used to generate heavy-ended sprays in accordance with the methods of the present invention.
Figure 4A:
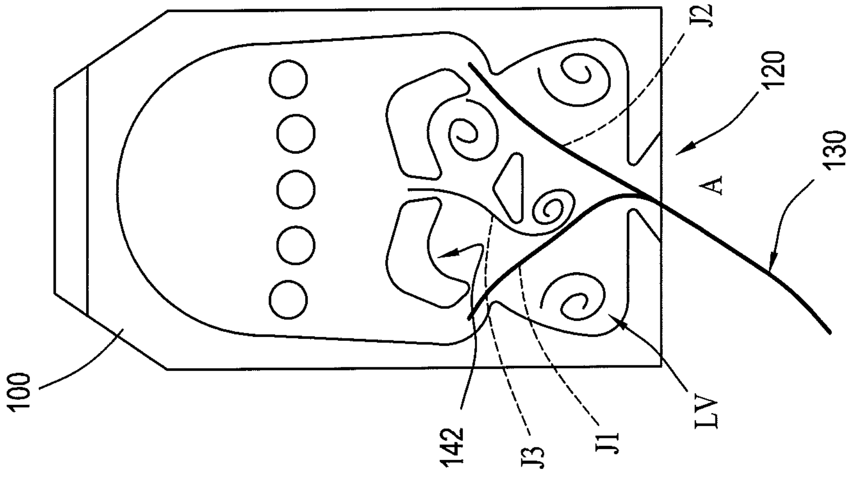
FIGS. 4A, 4B and 4C are plan views illustrating the fluid flows during an oscillation cycle within the improved three jet island fluidic circuit embodiment of FIG. 2, in accordance with the present invention.
Figure 4B:
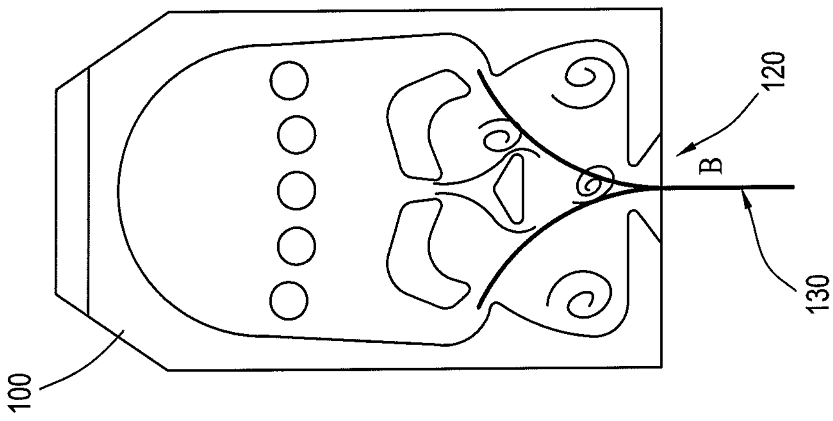
Figure 4C:
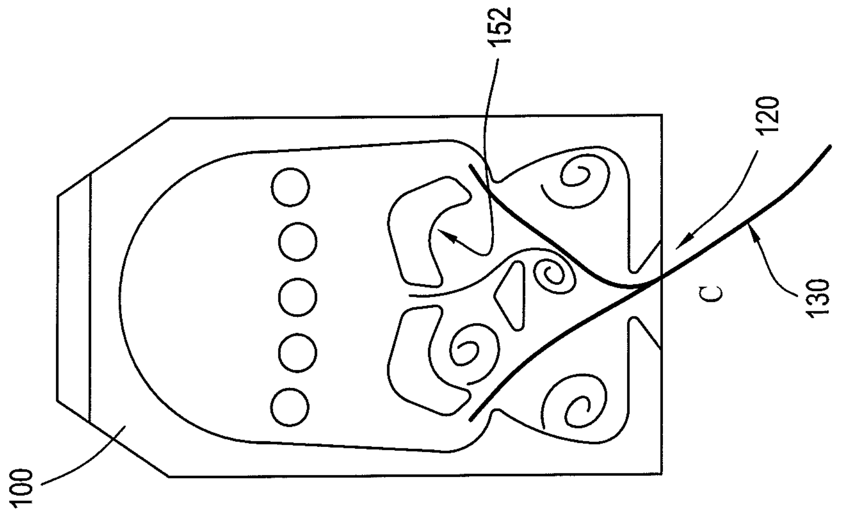

In accordance with a first embodiment of the present invention as illustrated in FIGS. 2-4C, an improved method and apparatus for generating sprays includes a nozzle assembly preferably having a cavity (e.g., such as spray housing 10 with cavity 20, as shown in FIG. 1F), but configured to receive an improved three jet island fluidic circuit 100. FIG. 2 is a top view or plan view diagram illustrating improved three jet island fluidic oscillator 100 having an interaction region 118 configured to receive and act upon first, second and third jets J1, J2, J3 entering from first power nozzle 114A, second power nozzle 114B and third power nozzle power nozzle 114C. As best seen in FIGS. 4A, 4B and 4C, during an oscillation cycle, the center jet J2 flows distally along central axis 102 and impacts directly on a novel island-shaped obturator 126 which projects inwardly into interaction chamber 118, for use in generating precise and more uniform oscillating sprays with higher viscosity fluids, as illustrated in FIG. 3A.

The first embodiment of the fluidic circuit of the present invention 100 as illustrated in FIG. 2 has a plurality of sections which cooperate with one another to act upon the flowing fluid passing therethrough to generate a desired oscillating spray 130. The fluid flows from a proximal inlet (generally at 112) downstream or distally through the sections described below and is emitted as an oscillating spray of fluid droplets from the throat or outlet 120, and, for purposes of nomenclature, a central or flow axis 102 is defined as a straight line extending from the center of the feed inlet 110 to the center of the throat opening 120. The features acting on the distally flowing pressurized fluid flowing within and through oscillator circuit 100 are preferably symmetrically defined about central axis 102.

Referring again to FIG. 2, improved three jet island oscillator circuit 100 is composed of first, second and third lumens or power nozzles 114A, 114B and 114C, which accelerate distally flowing fluid from inlet region 112 into interaction chamber 118 and a reconfigured island protuberance 126 that projects into interaction chamber 118 downstream of the center of the three power nozzles 14A, 14B, 14C. The interaction chamber 118 can be considered to have an upstream portion and a downstream portion, with the upstream portion having a pair of boundary edges and longitudinal centerline or central axis 102 equally spaced from these edges. In the illustrated embodiment, the first and second power nozzles 114A and 114B are seen to be laterally spaced from the centerline and located at each of the edges of the interaction chamber's upstream portion, and the third power nozzle 114C is located on approximately the centerline of the interaction chamber's upstream portion.

As best seen in FIG. 2, interaction chamber 118 has a selected width IW and terminates distally or downstream at a centered outlet lumen or throat 120 from which an oscillating spray exhausts and is defined between right side and left side sidewalls that diverge downstream. Throat 120 is nominally symmetrically defined around the centerline 102 and preferably defines a rectangular lumen having a selected transverse Throat Width TW. Within interaction chamber 118, island 126 is spaced distally directly downstream of third power nozzle 114C on centerline 102 and has a substantially planar transverse distal island wall segment having selected transverse island width IW. Each Power Nozzle generates a flow along a selected power nozzle flow axis having a selected flow axis angle and has a selected Power nozzle Width $P_W$ which generates a corresponding aimed fluid jet J1, J2, J3 centered initially along the selected power nozzle's flow axis. The first and second laterally spaced power nozzles 114A, 114B generate first and second fluid jets J1, J2 which intersect in the interaction region downstream or distally of the island 126 at a Jet intersection point JL and at a selected obtuse jet intersection angle, $J_A$. The jet intersection angle "$J_A$" is particularly defined as "obtuse" because it is greater than a right angle (or 90 degrees) but less than 180 degrees. Through experimentation and evaluation of development prototypes, applicants have discovered that this fluidic circuit's performance is best when the selected obtuse jet intersection angle, $J_A$ is in the range of 100 degrees to 140 degrees. In the illustrated embodiment $J_A$ is 110 degrees. Island 126 is seen to be configured distally or downstream of the outer or first and second laterally spaced power nozzles 114A, 114B, as shown in FIGS. 2 and 4A-4C.

The applicants have discovered that by appropriately pressuring, orienting and scaling these elements, one is able to generate improved flow vortices which travel distally behind or downstream of island 126 in a manner that permits those vortices to be swept out of the throat in a more uniform manner such that the vortices are alternately proximate the throat's right sidewall and then its left sidewall. An improved triangular shape and position have been selected as a preferred embodiment for island 126. Substantially triangular island 126 is oriented so that one of its points faces the oncoming flow of fluid jet J3 from the center power nozzle 114C, as best seen in FIGS. 4A-4C.

In fluidic oscillator circuit 100, the first, second and third orifices 114A, 114B and 114C are defined between the interaction chamber's opposing left and right side walls and first and second curved, transverse fluid impermeable wall segments 140, 150, where the first curved, transverse wall segment 140 provides a first concave wall surface 142 defining a first cylindrical wall section of a selected radius and the second curved transverse wall segment 150 provides a second concave wall surface 152 defining a second cylindrical wall section of a second selected radius which is substantially equal to said first concave wall surface's selected radius. The first and second concave wall surfaces 142, 152 define laterally offset cylindrical wall sections configured to receive and contain laterally offset fluid vortices (see, e.g., FIGS. 4A and 4C) which are formed, grow and move about within the interaction chamber 118.

The three fluid jets J1, J2, J3 cause vortices to form and move about within interaction chamber 118 in a bistable periodic oscillation cycle illustrated sequentially in FIGS. 4A, 4B and 4C. The bistable oscillation cycle is initiated when the center jet J3 alternates on each side of the interaction chamber's upwardly projecting island 126 and alternately sheds or generates laterally spaced (e.g., left and right side) vortices. Initially, as illustrated in FIG. 4A, center jet J3 is on one side of the island (i.e., the left side) resulting in a large vortex LV on that left side. Left side vortex LV partially blocks or suppresses the left side jet J1 flowing from the left side orifice 114A, resulting in (a) initiation of a right side vortex upstream of island 126 and proximate the right side orifice 114B and (b) the right jet J2 dominating the output jet exiting the outlet orifice or throat lumen 120, thereby defining the left extreme end or edge of the traverse defining the fan shape of the fluidic's spray 130. In time, the left side vortex and right side vortex both move distally within chamber 118 and the center jet J3 is laterally displaced or forced to begin moving towards the opposing (i.e., right) side of island 126.

During this transitory phase (illustrated in FIG. 4B), the output jet of spray from outlet orifice 120 is moving laterally and passing through the center of the spray fan. When the center jet moves laterally to the right side of island 126 (as shown in FIG. 4C), the jet spray from outlet orifice 120 is aimed at its right extreme. This oscillation cycle repeats itself at relatively high frequency (as high as 300 Hz depending on size and operating pressures/flow rates).

The first, second and third jets J1, J2, J3 cause the vortices to form and move laterally and distally within the interaction chamber 118 in a bistable periodic oscillation cycle which is initiated when center jet J3 begins alternating on left and right (or laterally opposing) sides of the upwardly projecting island 126 which causes center jet J3 to alternately shed or generate the distally moving laterally spaced (e.g., left and right side) vortices. As a result of this oscillation inducing method, enhanced three jet island fluidic circuit 100 generates improved sprays with cold, viscous fluids and a more uniform spray pattern within a given nozzle assembly's spray fan angle. The spray performance is illustrated as the plotted solid line in FIG. 3A, which illustrates the cell volume percentage of total spray across the spray pattern's fan (for a selected spray fan angle see, e.g., FIGS. 1C and 1E). The resulting spray volume per cell varied from about 1.6% of the total volume to about 2.2% of the total volume, which is much more uniform that the sprays generated by the applicant's prior art feedback oscillator (dotted line) or mushroom oscillator (dashed line).

In accordance with the method of the present invention, there are at least two distinct, non-obvious and surprisingly effective configurations for the improved three jet island's power nozzles 114A, 114B and 114C:

A) For a substantially uniform spray pattern, all three power nozzles 114A, 114B and 114C are substantially equal in lumen area (e.g., rectangular cross sectional area width and depth). This results in a uniform spray distribution over the spray fan (as illustrated in FIG. 3A).

B) Alternatively, for a heavy-ended spray pattern, the lumen areas of side power nozzles (similar to 114A, 114B) are equal and slightly larger than the center power nozzle (larger than 114C) (e.g., where the Depth of all three power nozzles is equal). This results in a slightly more fluid at the edges of the spray fan (as illustrated with the dotted line plot of FIG. 3B).

As noted above, jet intersection angle $J_A$, as shown in FIG. 1, is in the range of 100 degrees to 140 degrees. Applicants have tested in the range of 90-180 degrees and found that $J_A$ should be in the range of 100 degrees to 140 degrees (preferably 110 degrees) to perform the best for the above configuration. Previously (in applicant's prior U.S. Pat. Nos. 7,472,848 and 7,651,036) the jet angle was not an obtuse angle but a "straight" angle of 180 degrees meaning that the jets from the left and right side power nozzles were aimed directly at one another from power nozzle openings which were distal from or downstream of the island 24 (see, e.g., FIGS. 10 and 11 prior U.S. Pat. No. 7,472,848 and FIGS. 5A-13 of prior U.S. Pat. No. 7,651,036 (copied here as FIGS. 1G-1Q)). Applicant's development work and experiments eventually led to discovery that the improved performance of the present invention required that the vortex generation mechanism work differently than applicant's prior geometries, and required that more "vortex generating" area be provided above or upstream of the island. This is why the first, second and third orifices 114A, 114B and 114C are defined between the interaction chamber's opposing left and right side walls and the inverted bowl shaped first and second curved, transverse fluid impermeable wall segments 140, 150. First concave wall surface 142 defines a first cylindrical wall section and provide a first or left side vortex generating area which is upstream of or above and to the left of island 126. Second concave wall surface 152 defines a second cylindrical wall section and provides a mirror image or right side vortex generating area which is upstream of or above and to the right of island 126. The first and second concave wall surfaces 142, 152 define laterally offset cylindrical wall sections and the symmetrically configured left and right side vortex generation areas are configured to generate and contain laterally offset fluid vortices (see, e.g., FIGS. 4A and 4C) which are formed, grow and move about within the interaction chamber 118.

The fluid spray performance improvements obtained with the new geometry illustrated in FIGS. 2-4C include:

1. Higher spray velocity/higher efficiency
2. Improved cold performance
3. Improved fan angle range (20 to 120 degrees)—fan angles of more than 90 degrees with high velocity droplet spray
4. Uniform fan distribution, or optionally
5. Heavy-ended distribution, when preferred.

As best seen in FIG. 2, applicant's preferred embodiment (discovered through developmental testing using varying prototypes in several experiments) is illustrated and drawn substantially to scale. Triangular island 126 is centered laterally on central axis 102, with the island's proximal or upward tip axially aligned with and pointing to the center of the center or third power nozzle 114C which is also centered on central axis 102.

In fluidic oscillator circuit 100, the first, second and third orifices 114A, 114B and 114C shown to be defined between the interaction chamber's opposing left and right side walls and first and second curved, transverse fluid impermeable wall segments 140, 150, where the first curved, transverse wall segment 140 provides a first concave wall surface 142 defining a first cylindrical wall section of a selected radius and the second curved transverse wall segment 150 provides a second concave wall surface 152 defining a second cylindrical wall section of a second selected radius which is substantially equal to said first concave wall surface's selected radius. The first and second concave wall surfaces 142, 152 define laterally offset cylindrical wall sections configured to receive and contain laterally offset fluid vortices (see, e.g., FIGS. 4A and 4C) which are formed, grow and move about within the interaction chamber 118.

Turning now to the particulars for the embodiment illustrated in FIG. 2, each power nozzle (114A, 114B, 114C) defines a rectangular groove or trough having a selected depth ("$P_D$") and power nozzle width ("$P_W$"). Fluidic 100 is configured to spray windshield washing fluid so the typical power nozzle depth ("$P_D$") is 1.3 millimeters ("mm") and the power nozzle width ("$P_W$") is 0.55 mm. The configuration of the fluid passages and the internal structural features defining fluidic circuit 100 are characterized in terms of linear dimensions or spacings and applicants have discovered relationships among those dimensions can be scaled up or down depending on the fluid spray application and expressed in terms of multiples of power nozzle width ("Pw"). The features within interaction chamber 118 are configured at selected locations along central axis 102 between the center power nozzle 114C and outlet orifice 120, which is centered in the interaction chamber's distal end wall 160 which provides the reference line for measuring these axial distances.

(a) Island location, $I_{SL}$: triangular island 126 has a transverse distal end wall which is planar and is centered on central axis 102 and facing outlet orifice 120. The island's distal transverse planar end wall is spaced proximally or upstream at an axial spacing equal to 4.5 times the power nozzle width (4.5*Pw) from the oscillation chamber's distal end wall 160 and the center of outlet orifice 120 on central axis 102.

(b) Island width, $I_{SW}$: The distal transverse planar end wall has a transverse width which is referred to as the Island width, and adjusting this dimension was found to be critical for enhancing cold performance. A larger island width increases starting pressures in cold, which is undesirable. Applicants found a suitable width to be in the range of 3.3 to 3.6 times Pw. This width range is also suitable for manufacturing by modern plastic injection molding methods since need the inwardly projecting island protuberance must to be large enough for plastic molding.

(c) Island height: Island 126 projects upwardly from the floor of or inwardly into the cavity or interior volume of interaction chamber 118 by a selected height. The island's height is preferably as small as possible (given practical limits for manufacturing parts from injection molded plastic or the like) keeping it feasible for commercially reasonable manufacturing processes.

(d) Interaction region width, $I_W$: Applicants found optimum values in the range of 12.5 to 13.5 times the Power Nozzle Width, Pw (preferably 13 Pw).

(e) Interaction region height, $I_T$: The depth of interaction chamber 118 or interaction region height also the upwardly projecting height of interaction chamber lateral boundary defining side walls or of end wall 160, which is a critical dimension and varies between 7.5-8.5 Pw.

(f) Jet intersection point, $J_1$: This is a critical dimension and enhanced performance was observed when the range was within 2.5 to 3 times Pw (2.5-3*Pw) from the oscillation chamber's distal end wall 160 and the center of outlet orifice 120 on central axis 102.

(g) Jet intersection angle, $J_A$: As mentioned above, optimum performance is achieved when the jet-flow axes for the outer-most jets J1, J2 is in the range of 100 degrees to 140 degrees (e.g., 110 degrees (as seen in FIGS. 2, 4A-4C)).

Improved three jet island fluidic circuit 100, when configured as illustrated in FIGS. 2, 4A-4C with a throat width of 1 mm and a throat depth of 1.3 mm (providing a rectangular spray orifice 120) is capable of generating spray velocity of approximately 14 m/s when pressurized with a flow of 840 ml per minute at a temperature of 22 degrees Fahrenheit, to generate a spray fan with a 60 degree fan angle. This is enabled because the geometry of the features within interaction chamber 118 provides a smaller than expected throat area to power nozzle area ratio for a spray's given fan angle (e.g., within the range of 20 degrees to 120 degrees).

In the illustrated example, for a 60 degree fan, the throat area is 60% of the power nozzle area. In contrast, in case of applicant's prior patented mushroom circuit, throat area is 100% of the power nozzle area for the same fan angle. Hence, for fluidic circuit 100, pressure losses leading to the throat 120 are lower, which makes a higher spray velocity possible. The higher spray velocity demonstrated is a significant improvement for better dynamic performance (spray performance against wind speed as seen in automotive applications), compared with prior art nozzles.

Improved Cold Performance

Island location, island width, Jet angle ($J_A$) of 110 degrees and the larger vortex formation area (available for vortices upstream of the island) allow the fluidic 100 to begin oscillating (or "start") at a lower fluid pressure with high viscosity liquids. In a washing fluid solution of methanol and water at 50-50 composition, a nozzle spray pattern with a full fan angle (e.g., 60 degrees) is achieved at 3 psi and above. Applicants also found improved cold performance for smaller values of island width. It is a combination of these features that provide better cold performance than earlier embodiments.

Fluid Spray Droplet Distribution

Turning now to FIGS. 3A and 3B, measured spray performance plots (Volume distribution of the spray fan (fan angle of 60 degrees)) are illustrated, in which the Y axis represents cell volume % of total and X axis is the cell number. The performance of the nozzle assembly using fluidic circuit 100 is illustrated in the solid line of FIG. 3A and shows a more uniform distribution, meaning that when in use, the nozzle assembly spreads sprayed liquid more evenly over its fan angle than prior art nozzles. This performance is clearly more uniform than for feedback fluidic or mushroom fluidic types of fluidic nozzles.

FIG. 3B illustrates (in the dot-dash trace as shown on the right side of the legend) the plotted measured spray performance for another improved three jet island fluidic oscillator configured for a heavy-ended spray pattern embodiment as described above (with larger lumen area power nozzles 114A and 114B as described for option 2, having the smaller lumen center power nozzle (e.g., 114C)).

Returning to FIGS. 4A-4C, the operating mechanism for generating and maintaining an oscillating spray in fluidic 100 is illustrated as a sequence of frozen moments illustrating the position and size of vortices in an oscillation cycle. In accordance with the method of the present invention, an oscillation cycle for three jet bistable oscillator 100 is generated when the center jet ("J3") flows distally and alternately flows on opposing left and right sides of island 126 and alternately sheds vortices as shown. In FIG. 4A, center jet is on the left side as is the large vortex LV. This vortex LV blocks or suppresses the left side jet J1, resulting in the right jet J2 dominating the output jet exiting the throat lumen 120 which is then swept to the left extreme of the fan angle for spray 130. As the oscillation cycle progresses, the center jet begins to move towards the right side of the island. During this phase the output jet is passing through the center of the fan issuing from throat lumen 120. In FIG. 3C, the center jet is on the right side of the island and the output jet is at its right extreme of the fan. This cycle repeats itself at relatively high frequency (as high as 300 Hz depending on size and operating pressures/flow rates).

Broadly speaking, the method for controlling fluids in the three jet bistable oscillator 100 of the present invention requires a fluidic oscillator (e.g., 100, 200 or 300 (described below) operating on a pressurized fluid flowing therethrough to generate an exhaust flow in the form of an oscillating spray of fluid droplets (e.g., 130, 330), where the oscillator includes: an inlet (e.g., filling region 112 which may optionally include an array of filter posts 122) for the pressurized fluid, which then flows into first, second and third power nozzles 114A, 114B, 114C, each having a floor and sidewalls that are configured to define a venturi-shaped tapered lumen to accelerate the movement of that pressurized fluid to form first, second and third jets of fluid that flow from each said power nozzle, where each power nozzle's resulting jet is aligned along a selected jet-flow axis. The fluidic oscillator defines a fluid communication pathway that connects and allows for the flow of the fluid between the inlet 112 and the first, second and third power nozzles, and that fluid communication pathway has a boundary surface that includes a pair of sidewalls to define an interaction chamber 118 which is in fluid communication with the first, second and third power nozzles and which receives first, second and third jet flows from the first, second and third power nozzles. Interaction chamber 118 has a floor, an outlet orifice 120 from which the oscillating spray exhausts, and an upwardly or inwardly projecting island protuberance 126 defining first, second and third island wall segments projecting upwardly from the floor of chamber 118 and placed at an intersection of the jet-flow axes such that island 126 is impacted by the first, second and third jets from the first, second and third power nozzles (as seen in FIGS. 4A, 4B and 4C). Island 126 is spaced from but is preferably aligned along a common longitudinal axis of symmetry with outlet orifice 120 within interaction chamber 118.

Tee-Island, Three Jet Fluidics

Figures 5A, 5B:
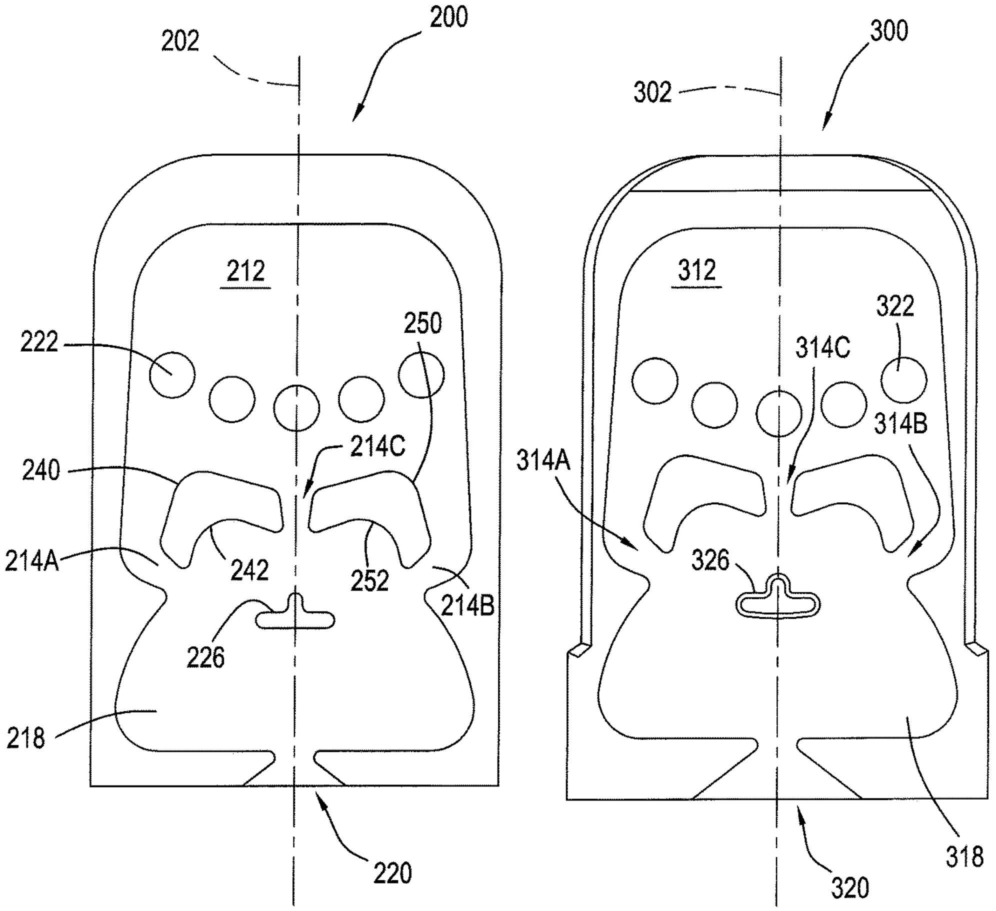
FIGS. 5A and 5B are plan views illustrating alternative embodiments for a Tee-Island fluidic circuit embodiment, in accordance with the present invention.

Two additional embodiments are illustrated in FIGS. 5A and 5B, beginning with the embodiment of FIG. 5A, Tee-island three jet oscillator circuit 200 is composed of first, second and third power nozzles 214A, 214B, 214C, which accelerate fluid from inlet region 212 into interaction chamber 218 and Tee-island protuberance 226 projects into interaction chamber 218 downstream of the center of the three power nozzles 214C. The interaction chamber 218 can be considered to have an upstream portion and a downstream portion, with the upstream portion having a pair of boundary edges and a longitudinal centerline or central axis equally spaced from these edges. In the illustrated embodiment, the first and second power nozzles 214A and 214B are seen to be laterally spaced from the centerline and located at each of the edges of the interaction chamber's upstream portion, and the third power nozzle 214C is located on approximately the centerline or central axis of symmetry of the interaction chamber's upstream portion.

Interaction chamber 218 has a selected width $I_W$ and terminates distally or downstream at a centered outlet lumen or throat orifice 220 from which an oscillating spray exhausts and is defined between right side and left side sidewalls that diverge downstream. Throat orifice 220 is nominally symmetrically defined around the centerline and defines a rectangular lumen having a selected transverse Throat Width $T_W$. Tee-Island 226 is located directly downstream of central power nozzle 214C that is located on the centerline of the interaction chamber 218 and has a selected transverse Island Width $I_W$. Each Power Nozzle generates a flow along a selected power nozzle flow axis having a selected flow axis angle and has a selected Power nozzle Width PW which generates a jet centered initially along the selected power nozzle flow axis. The first and second laterally spaced power nozzles 214A, 214B generate first and second fluid jets which intersect in the interaction region downstream or distally of the island 226 at a Jet intersection point JL and at a selected Jet intersection Angle, $J_A$.

In fluidic oscillator circuit 200, the first, second and third orifices 214A, 214B and 214C shown to be defined between the interaction chamber's opposing left and right side walls and first and second curved, transverse fluid impermeable wall segments 240, 250, where the first curved, transverse wall segment 240 provides a first concave wall surface 242 defining a first cylindrical wall section of a selected radius and the second curved transverse wall segment 250 provides a second concave wall surface 252 defining a second cylindrical wall section of a second selected radius which is substantially equal to said first concave wall surface's selected radius. The first and second concave wall surfaces 242, 252 define laterally offset cylindrical wall sections configured to receive and contain laterally offset fluid vortices which are formed, grow and move about within the interaction chamber 218.

As with fluidic circuit 100, above, the applicants have discovered that by appropriately pressuring, orienting and scaling the fluidic circuit elements of oscillator 200, one is able to generate improved flow vortices before and behind island 226 that are swept out of the throat in a more uniform manner such that the vortices are alternately proximate the throat's right sidewall and then its left sidewall. The tee-island shape and position have been selected as a preferred embodiment for island 226. Tee-island island 226 is oriented so that one of its points faces the distally flowing oncoming fluid from the center power nozzle 214C which are aligned along central axis 202, as best seen in FIG. 5A.

Figure 6A:
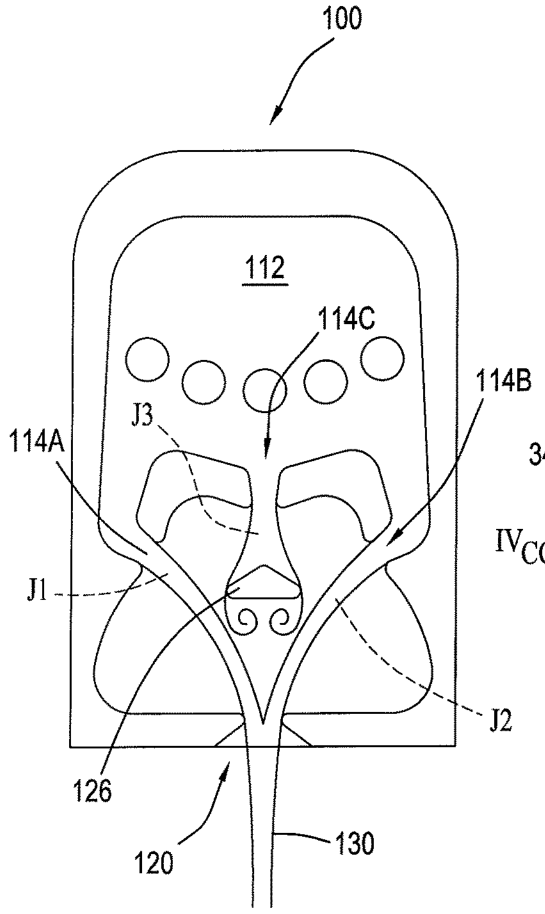
FIG. 6A is a plan view illustrating the fluid flows in the fluidic circuit embodiments of FIGS. 2, 4A, 4B and 4C, in accordance with the present invention.
Figure 6B:
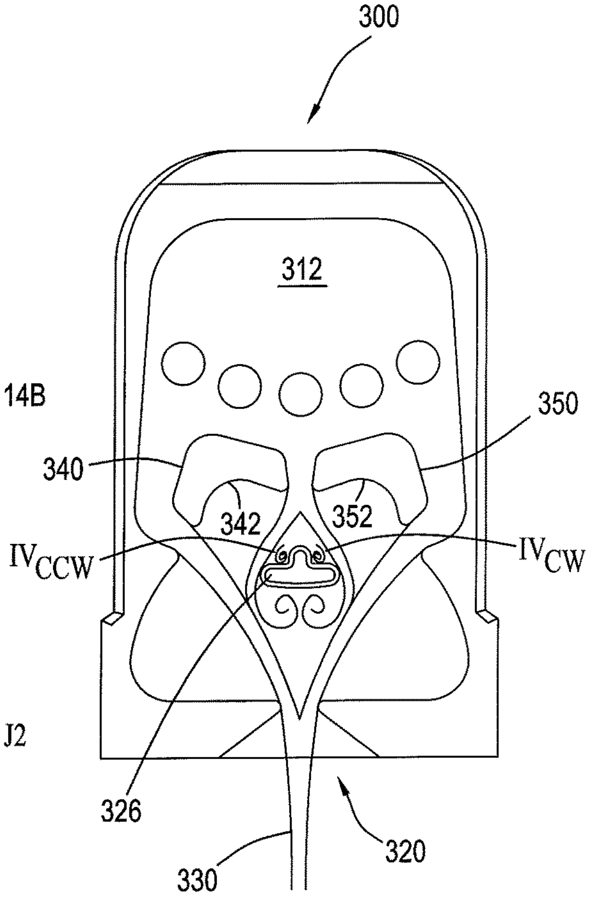
FIGS. 6B and 6C are a plan views illustrating the fluid flows in the Tee-Island fluidic circuit embodiment of FIG. 5B, in accordance with the present invention.
Figure 6C:
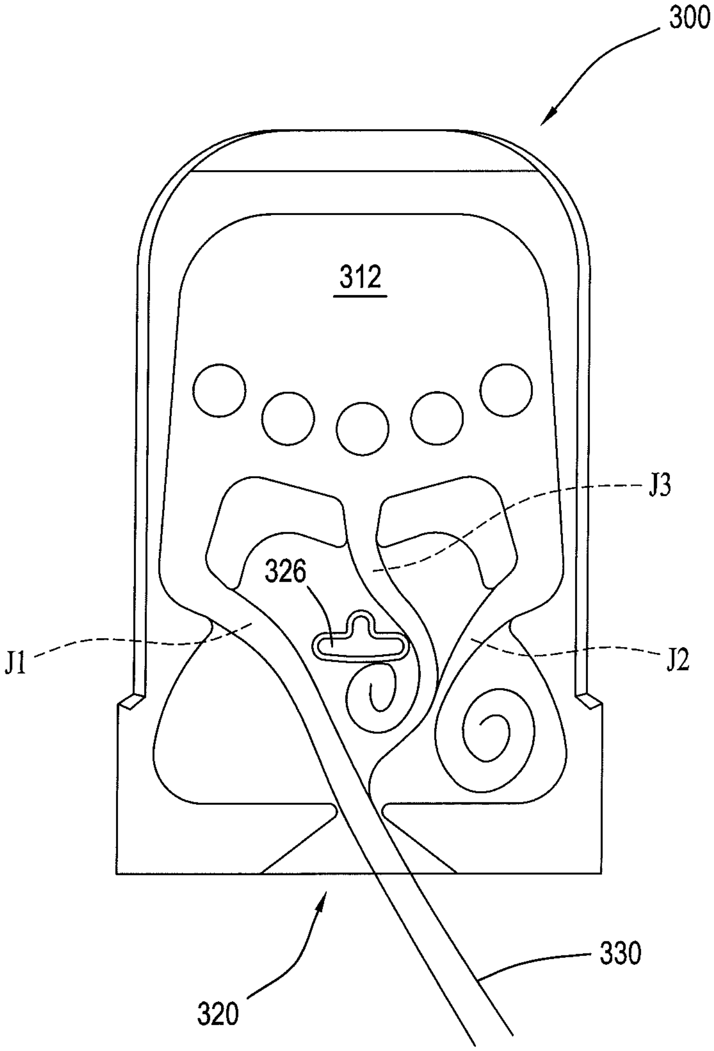

Turning next to FIGS. 5B, 6B and 6C, another Tee-island three jet oscillator circuit 300 is composed of first, second and third power nozzles 314A, 314B, 314C, which accelerate fluid from inlet region 312 into interaction chamber 318 and Tee-island protuberance 326 projects into interaction chamber 318 downstream of the center of the three power nozzles 314C. The interaction chamber 318 can be considered to have an upstream portion and a downstream portion, with the upstream portion having a pair of boundary edges and a longitudinal centerline or central axis equally spaced from these edges. In the illustrated embodiment, the first and second power nozzles 314A and 314B are seen to be laterally spaced from the centerline and located at each of the edges of the interaction chamber's upstream portion, and the third power nozzle 314C is located on approximately the centerline or central axis of symmetry of the interaction chamber's upstream portion.

Interaction chamber 318 has a selected width IW and terminates distally or downstream at a centered outlet lumen or throat orifice 320 from which an oscillating spray exhausts and is defined between right side and left side sidewalls that diverge downstream. Throat orifice 320 is nominally symmetrically defined around the centerline and defines a rectangular lumen having a selected transverse Throat Width TW. Tee-Island 326 is located directly downstream of central power nozzle 314C that is located on the centerline of the interaction chamber 318 and has a selected transverse Island Width IW. Each Power Nozzle generates a flow along a selected power nozzle flow axis having a selected flow axis angle and has a selected Power nozzle Width PW which generates a jet centered initially along the selected power nozzle flow axis. The first and second laterally spaced power nozzles 314A, 314B generate first and second fluid jets which intersect in the interaction region downstream or distally of the island 326 at a Jet intersection point JL and at a selected Jet intersection Angle, $J_A$. The fluidic oscillator geometries illustrated in FIGS. 5A and 5B are similar in operation, but island 326 illustrated in FIG. 5B is larger and has been made more "plastic injection mold friendly" than island 226 as illustrated in FIG. 5A.

In fluidic oscillator circuit 300, the first, second and third orifices 314A, 314B and 314C shown to be defined between the interaction chamber's opposing left and right side walls and first and second curved, transverse fluid impermeable wall segments 340, 350, (e.g., as shown in FIG. 6B) where the first curved, transverse wall segment 340 provides a first concave wall surface 342 defining a first cylindrical wall section of a selected radius and the second curved transverse wall segment 350 provides a second concave wall surface 352 defining a second cylindrical wall section of a second selected radius which is substantially equal to said first concave wall surface's selected radius. The first and second concave wall surfaces 342, 352 define laterally offset cylindrical wall sections configured to receive and contain laterally offset fluid vortices which are formed, grow and move about within the interaction chamber 318.

Turning now to FIGS. 6B and 6C, by appropriately pressuring, orienting and scaling these elements, one is able to generate improved flow vortices upstream or proximally of (before) and downstream or distally of (behind) island 326 and those moving vortices are swept out of the throat 320 in a more uniform manner such that the vortices are alternately proximate the throat's right sidewall and then its left sidewall. A tee-island shape and position have been selected as a preferred embodiment for island 326. Substantially Tee-shaped island 326 has a laterally projecting transverse wall segment terminating in left and right side wall ends or points as well as a proximally projecting axially aligned wall segment terminating proximally in a wall end or point which faces the distally flowing oncoming fluid from the center power nozzle 314C, as best seen in FIGS. 6B and 6C. The purpose of the fluidic circuits of FIGS. 5A and 5B is to improve to further "starting" and cold performance. Typically the goal is to reduce nozzle pressure below 17 psi for a 50-50 mix of ethanol at zero degrees F. (where liquid viscosity >20 cP). The illustrated designs will provide this performance, or better. Additionally, sprays 230 and 330 and spray edges from the outlet orifice (e.g., 220, 320) are much crisper (i.e. testing showed more liquid volume at spray edges, resulting in a cleaner fan appearance). Also, spray oscillation is more efficient, so for a given TA (throat area)/PA (power nozzle area) ratio, the spray fan angle for sprays 230 and 330 is higher.

The main feature for fluidic embodiments 200 and 300 of FIGS. 5A and 5B is the modified Tee island shape that resulted in better startup for cold temperatures and higher viscosity fluids (which is characterized and better "cold performance"). This improvement was obtained by designing for better oscillation initiation or starting. Referring to FIG. 6A (which shows the improved three jet island oscillator 100, as illustrated in FIG. 2 and described above) and FIGS. 6B and 6C (which shows proposed Tee island shapes for the present invention), the triangular island 126 of oscillator 100 (isosceles triangle) performs fine with water thinned to medium viscosity (e.g. <15 cP) but struggles with and may not begin oscillating liquids of high viscosity (e.g. >20 cP). Once applicants discovered this issue, they modified the shape of the island to the inverted Tee configuration 226, 326 (but having the same transverse width or base dimension ISW as the isosceles triangle island 126) applicants then observed better performance with high viscosity liquids. For example, spraying with fluidic 100 as illustrated in FIGS. 2 and 6A requires more than 25 PSI of fluid pressure to produce a spray fan for a sprayed fluid comprising an ethanol mixture at 0 F, while the Tee-island fluidics 200, 300 operate at significantly lower fluid pressures (e.g., less than 17 PSI for the same ethanol mixture). The oscillation inducing method is similar to that described above, and illustrated in FIGS. 4A-4C. For example, FIG. 6A illustrates a symmetrical (monostable, non-oscillating) flow field within interaction chamber 318 onto triangular island 126 of oscillator 100 (as described above) and FIG. 6B illustrates a momentarily symmetrical flow field for the newer Tee island oscillator 300. FIG. 6C illustrates an oscillating flow field for the newer Tee island oscillator 300.

For high viscosity liquids, because of the reduced Reynolds number, there is a strong tendency for the flow to be symmetric, resulting in straight stream as the output (no oscillating jet) as shown in FIGS. 6A and 6B, and when oscillators reach a non-oscillating state, the nozzle assembly will fail to provide the required spray pattern.

In accordance with the method of the present invention, there are at least two distinct and surprisingly effective configurations for the Tee island's power nozzles 314A, 314B and 314C:

A) For a substantially uniform spray pattern, all three power nozzles 314A, 314B and 314C are substantially equal in lumen area (e.g., rectangular cross sectional area width and depth). This results in a uniform spray distribution over the spray fan (similar to that illustrated in FIG. 3A).

B) Alternatively, for a heavy-ended spray pattern, the lumen areas of side power nozzles (similar to 314A, 314B) are equal and slightly larger than the center power nozzle (larger than 314C) (e.g., where the Depth of all three power nozzles is equal). This results in a slightly more fluid at the edges of the spray fan (similar to that illustrated with the dotted line plot of FIG. 3B).

In prior art oscillators and even with some early prototypes of the present invention (e.g., with triangular island 126, as illustrated in FIGS. 2 and 6A), an unwanted monostable state was found to cause the outlet spray 130 to stop traversing (meaning oscillation stops) when the center fluid jet splits smoothly into two streams around the island (e.g., 34, as shown in FIG. 1J).

The newer embodiments of the present invention solve this problem by providing (e.g., in Tee-Islands 226, 326) first and second L-shaped island wall segments or inside corner shaped pockets configured to receive flow from center jet ("J3") and, in response, create first and second very small counter-rotating island-pocket vortices IVCCW and IVCW (see, e.g., FIG. 6B), in the opposing left and right side inside corner wall segments defined by inverted Tee island 326. First and second counter rotating micro-vortices are set up when the center jet ("J3") splits around the island. These counter rotating micro-vortices IVCCW and IVCW become stronger and larger as pressure (and flow) is increased. As a result, there is increased instability and the center jet J3 from center power nozzle 314C will no longer sustain a symmetrical flow around island 326. The fluid flow from the center jet will then be forced to switch over to one side of the island as shown in FIG. 6C, and sets up an oscillating flow field and spray 330.

The pressurized fluid flow pressure required to force initiation of oscillation in Tee-Island fluidic oscillator 300 is called the "switching pressure" and, as mentioned earlier, the switching pressure for oscillator 300 is less than 17 PSI, which is a significant improvement over the switching pressure required for the prior art and even over earlier prototypes (e.g., 100 as shown in FIGS. 2 and 6A) where switching pressures exceed 25 PSI.

Other characteristics for Tee-Island Fluidic Oscillators 200 and 300 are similar to those described above for the Improved Three Jet Island Fluidic Oscillator 100. Particularly, The Interaction region width, Iw: Applicants found optimum values in the range of 12.5-13.5 times the Power Nozzle Width, Pw (preferably 13 Pw);

Interaction region height, Il: This is a critical dimension and varies between 7.5-8.5 Pw;

Jet intersection point, Jl: This is a critical dimension and varies from 2.5-3 Pw;

Jet intersection angle, $J_A$: As mentioned above optimum performance is achieved when the jet-flow axes for the outer-most jets $J_A$ is in the range of 100 degrees to 140 degrees, and is preferably around 110 degrees (as seen in FIGS. 6B and 6C); and Improved spray velocity: Circuit 300 is capable of spray velocity of approximately 14 m/s. This is enabled because of the specialized geometry leading to a smaller throat area to power nozzle area ratio for a given fan angle.

It will be appreciated that makes an improved nozzle assembly and an improved fluidic oscillator circuit (e.g., 100, 200, 300) available which operates on a pressurized fluid to generate an oscillating spray of fluid droplets, and the oscillator aims fluid jets from first, second and third power nozzles (e.g., 114A, 114B, 114C) into an interaction chamber (e.g., 118) and toward an upwardly projecting island protuberance (e.g., 126) defining first, second and third island wall segments. Each power nozzle has a selected rectangular lumen area and width ("PW"). The island is spaced from and aligned along a common axis (e.g., 102) with an outlet orifice (e.g., 120) at the distal end of interaction chamber which defines an interaction region having an axial length, Il in the range of 7.5-8.5 Pw. The outermost jets (e.g., 114A, 114B) are aimed at an obtuse angle of 100-140 degrees along axes which intersect beyond the island at a Jet intersection point, Jl which is spaced from the orifice by a distance equal to 2.5-3 Pw. The upstream end of interaction chamber is defined by first and second laterally offset concave wall bowl-shaped surfaces (e.g., 142, 152) which define left side and right side vortex generating areas so that fluid jet steering vortices may be alternately formed and then displaced distally to steer the fluid jet laterally within interaction chamber as fluid is pumped through and thereby reliably create and maintain a laterally oscillating spray fan which projects from the outlet orifice into a spray (e.g., 130, 230, 330) having a selected fan angle in the range of 20-120 degrees with the improved spray velocity described above.

Having described preferred embodiments of new and improved nozzle configurations and methods, it is believed that other modifications, variations and changes will be suggested to those skilled in the art in view of the teachings set forth herein. It is therefore to be understood that all such variations, modifications and changes are believed to fall within the scope of the present invention as set forth in the appended claims.

What is claimed is:

1. A fluidic oscillator operating on a pressurized fluid flowing therethrough to generate an exhaust flow in a form of an oscillating spray of fluid droplets, said oscillator comprising:

an inlet for said pressurized fluid, first, second and third power nozzles, each of the first, second and third power nozzles having a floor and sidewalls that are configured to accelerate a movement of said pressurized fluid that flows through said first, second and third power nozzles to form a jet of fluid that flows from each of the first, second and third power nozzles, a fluid communication pathway that connects and allows for the flow of said fluid between said inlet and said first, second and third power nozzles, said fluid communication pathway having a boundary surface that includes a pair of sidewalls, and an interaction chamber in fluid communication with said first, second and third power nozzles which receives said first, second and third jets from said first, second and third power nozzles;

said interaction chamber having a floor, an outlet orifice from which said oscillating spray of fluid droplets exhausts, and an upwardly projecting island protuberance defining first, second and third island wall segments projecting upwardly from said chamber floor in a position which is impacted by said first, second and third jets from said first, second and third power nozzles, wherein said upwardly projecting island protuberance is spaced from but aligned along a common axis with said outlet orifice within said interaction chamber; and wherein said first and second jets are aligned along first and second jet axes which intersect at a jet intersection angle (JA), which is in a range of 100 to 140 degrees, wherein said interaction chamber defines an interaction region configured to initiate internal vortices in laterally spaced vortex generating areas which are upstream of the island protuberance wherein said vortices are forced distally or downstream and shed on alternating sides of the island protuberance, wherein said first, second and third power nozzles of said interaction chamber are defined between opposing left and right side walls and first and second inverted bowl shaped wall segments of the interaction chamber;

wherein said first bowl-shaped wall segment provides a first or left side vortex generating area which is upstream of or above and to the left of an island and said second bowl-shaped wall segment provides a mirror image or right side vortex generating area which is upstream of or above and to the right of said island; and wherein said symmetrical left and right side vortex generation areas are configured to generate and contain laterally offset fluid vortices upstream of the island protuberance.

2. The fluidic oscillator of claim 1, wherein said sidewalls of said first, second and third power nozzles are spaced apart by a power nozzle width (Pw), and wherein said interaction chamber defines an interaction region having an interaction region width (Iw) in a range of 12.5-13.5 times the power nozzle width (Pw).

3. The fluidic oscillator of claim 2, said interaction region having an axial length or height (Il) in a range of 7.5-8.5 times the power nozzle width (Pw).

4. The fluidic oscillator of claim 3, wherein said first and third jets intersect at a jet intersection point (JI) which is spaced from said orifice by a distance equal to 2.5-3 times the power nozzle width (Pw).

5. The fluidic oscillator of claim 4, wherein said first and second jets are aligned along said first and second jet axes which intersect at a jet intersection angle (JA) which is approximately 110 degrees.

6. The fluidic oscillator of claim 1, wherein said first and second jets are aligned along said first and second jet axes which intersect at said jet intersection angle (JA) which is approximately 110 degrees.

7. The fluidic oscillator of claim 1, wherein said first and second power nozzles have a larger lumen area than said third power nozzle, and wherein said fluidic oscillator generates a heavy-ended fan spray.

8. The fluidic oscillator of claim 1, wherein an upwardly projecting island protuberance of said interaction chamber defines said first, second and third substantially linear island wall segments projecting upwardly from said chamber floor in a symmetrical triangular sectioned vortex generating protuberance which is impacted by said fluid jet from said third power nozzle in a flow which is initially substantially parallel to said common axis.

9. The fluidic oscillator of claim 1, wherein said interaction chamber's upwardly projecting island protuberance defines first and second L-shaped island wall segments projecting upwardly from said chamber floor define, with a third wall segment a symmetrical Tee sectioned counter-rotating micro-vortex generating protuberance providing left and right side acute jet-catching inside corner-shaped wall segments which are impacted by said second jet from said second power nozzle in a flow which is initially substantially parallel to said common axis with said outlet orifice within said interaction chamber, wherein said left side acute jet-catching inside corner-shaped wall segment will is configured to be receive impinging fluid flow and generate a first micro-vortex having a first rotation direction, and wherein said right side acute jet-catching inside corner-shaped wall segment will generate a second micro-vortex having a second rotation direction opposing said first micro-vortex's direction in response to said impinging flow.

10. The fluidic oscillator of claim 1, wherein said the Tee-island fluidics initiate and maintain an oscillating spray pattern and operate at significantly lower than normal fluid pressures, and wherein said spray has a spray velocity of approximately 14 m/s.

11. A nozzle assembly configured to aim a spray of a fluidic oscillator at a surface to be sprayed, comprising:

a housing with a cavity configured to receive and support the fluidic oscillator operating on a pressurized fluid flowing therethrough to generate an exhaust flow in the form of an oscillating spray of fluid droplets, said oscillator including fluid passages in a substrate defining an inlet for said pressurized fluid, and first, second and third power nozzles, each of which having a floor and sidewalls that are configured to accelerate a movement of said pressurized fluid that flows through said first, second and third power nozzles to form a jet of fluid that flows from each of said first, second, and third power nozzles, said oscillator aims fluid jets from first, second and third power nozzles into an interaction chamber and toward an upwardly projecting island protuberance defining first, second and third island wall segments, wherein each of said first, second, and third power nozzles has a power nozzle width (Pw); wherein the island protuberance is spaced from and aligned along a common axis with an outlet orifice at a distal end of the interaction chamber and the interaction chamber defines an interaction region having an axial length in the range of 7.5-8.5 times said power nozzle width (Pw);

said fluidic oscillator further including a fluid communication pathway that connects and allows for the flow of said fluid between said inlet and said first, second and third power nozzles, said fluid communication pathway having a boundary surface that includes a pair of sidewalls, and an interaction chamber in fluid communication with said first, second and third power nozzles which receives first, second and third jets from said first, second and third power nozzles;

said interaction chamber having a floor, an outlet orifice from which said spray exhausts from said interaction chamber, and an upwardly projecting island protuberance defining first, second and third island wall segments projecting upwardly from said chamber floor in a position which is impacted by said first, second and third jets from said first, second and third power nozzles, wherein said upwardly projecting island protuberance is spaced from but aligned along a common axis with said outlet orifice within said interaction chamber; and wherein said first and second jets are aligned along first and second jet axes which intersect at a jet intersection angle, (JA), which is in a range of 100 to 140 degrees, and wherein said first and second jets are aimed at an obtuse angle of 100 to 140 degrees along said axes which intersect beyond the island at a jet intersection point (Ji) which is spaced from the orifice by a distance equal to 2.5-3 times the power nozzle width (Pw) and wherein an upstream end of said interaction chamber is defined by first and second laterally offset concave wall surfaces which define left side and right side vortex generating areas so that fluid jet steering vortices may be optionally formed and then displaced distally to steer the fluid jet laterally within said interaction chamber and reliably create and maintain a laterally oscillating spray fan which projects from said orifice into a selected fan angle of 20 to 120 degrees.

12. The nozzle assembly of claim 11, wherein said sidewalls of said first, second, and third power nozzles are spaced apart by said power nozzle width (Pw), and wherein said interaction chamber defines an interaction region having an interaction region width (Iw) in a range of 12.5-13.5 times the power nozzle width (Pw).

13. The nozzle assembly of claim 12, wherein said interaction chamber defines an interaction region configured to initiate internal vortices in laterally spaced vortex generating areas which are upstream of the island protuberance wherein said vortices are forced distally or downstream and shed on alternating sides of the island protuberance.

14. An improved method for generating and maintaining an oscillating spray in a fluidic oscillator, wherein an interaction chamber defines an interaction region configured to initiate internal vortices in laterally spaced vortex generating areas which are upstream of an island protuberance wherein said vortices are forced distally or downstream and shed on alternating sides of the island protuberance;

wherein said interaction chamber's first, second and third power nozzles are defined between the interaction chamber's opposing left and right side walls and first and second inverted bowl shaped wall segments;

wherein said first bowl-shaped wall segment provides a first or left side vortex generating area which is upstream of or above and to the left of an island and said second bowl-shaped wall segment provides a mirror image or right side vortex generating area which is upstream of or above and to the right of said island; and wherein symmetrical left and right side vortex generation areas are configured to generate and contain laterally offset fluid vortices upstream of the island protuberance, said method comprising the method steps of:

(a) providing a fluidic oscillator having an inlet for pressurized fluid, first, second and third power nozzles, and an outlet orifice defined along a central spray axis;

(b) configuring first, second and third power nozzles in said fluidic oscillator to accelerate the movement of said pressurized fluid that flows through said first, second and third power nozzles to form first, second and third jets of fluid flowing into an interaction chamber where those first, second and third jets will flow into and against an island protuberance which is spaced from an outlet orifice but aligned along the central spray axis; wherein said first and second jets are aligned along first and second jet axes which intersect at a Jet intersection angle, JA which is in the range of 100 to 140 degrees;

(c) passing fluid into said inlet at a selected pressure and initiating internal vortices in laterally spaced vortex generating areas which are upstream of the island protuberance and, by continuing to pass fluid into the inlet (d) forcing said vortices distally or downstream to shed on alternating sides of the island protuberance.

15. The method of claim 14, wherein the said fluid flow is provided a selected pressure of less than 17 PSI for a 50-50 water ethanol mixture and an oscillating spray pattern is initiated and maintained.

* * * * *